(12) United States Patent  (10) Patent No.: US 7,874,779 B2
Csik et al.  (45) Date of Patent: Jan. 25, 2011

(54) FASTENERS, FASTENER COMPONENTS AND FASTENER RECEPTACLES

(75) Inventors: Terrence Csik, Pasadena, CA (US); Igor Komsitsky, Los Angeles, CA (US)

(73) Assignee: The Monadnock Company, City of Industry, CA (US)

( * ) Notice: Subject to any disclaimer, the term of this patent is extended or adjusted under 35 U.S.C. 154(b) by 567 days.

(21) Appl. No.: 11/781,777

(22) Filed: Jul. 23, 2007

(65) Prior Publication Data

US 2009/0028660 A1   Jan. 29, 2009

(51) Int. Cl.
F16B 21/04   (2006.01)
(52) U.S. Cl. ..................................... 411/553
(58) Field of Classification Search ............... 411/349, 411/549–553
See application file for complete search history.

(56) References Cited

U.S. PATENT DOCUMENTS

| | | | | |
|---|---|---|---|---|
| 2,239,125 A * | 4/1941 | Summers | ...................... | 411/552 |
| 2,315,335 A * | 3/1943 | Kane | ......................... | 411/552 |
| 2,368,713 A * | 2/1945 | Kane | ......................... | 411/552 |
| 2,378,122 A * | 6/1945 | Barlow | ........................ | 411/552 |
| 2,395,695 A * | 2/1946 | Summers | ...................... | 411/552 |
| 2,900,697 A * | 8/1959 | Cuss | ........................... | 411/349 |
| 2,922,211 A * | 1/1960 | Boyd | .......................... | 411/551 |
| 3,209,425 A * | 10/1965 | Barry | ......................... | 411/337 |
| 3,912,411 A * | 10/1975 | Moffat | ....................... | 403/259 |
| 4,207,655 A | 6/1980 | MacMaster | | |
| 4,442,571 A | 4/1984 | Davis et al. | | |
| 4,619,569 A * | 10/1986 | Wright | ....................... | 411/347 |
| 5,193,961 A | 3/1993 | Hoyle et al. | | |
| 5,690,460 A | 11/1997 | Attanasio | | |
| 6,688,831 B2 | 2/2004 | Antonucci et al. | | |
| 6,773,215 B2 * | 8/2004 | Cuva et al. | .................. | 411/553 |
| 2003/0185653 A1 | 10/2003 | Csik et al. | | |
| 2005/0008458 A1 | 1/2005 | Keech et al. | | |
| 2006/0156547 A1 | 7/2006 | Tarahomi | | |

* cited by examiner

*Primary Examiner*—Flemming Saether
(74) *Attorney, Agent, or Firm*—Henricks, Slavin & Holmes LLP

(57) ABSTRACT

Fasteners, fastener components and fastener receptacles, including quarter-turn fasteners may use a receptacle body having a non-metal material and one or more fastener engagement structures that together define a non-circular passage in the body. Underneath the fastener engagement structures, one or more support structures extend inwardly under the corresponding fastener engagement structures for supporting the underside of the fastener engagement structures. The support structures can have a concave configuration relative to an axis of the body. Additionally, a support structure can be co-extensive with the corresponding fastener engagement structure.

55 Claims, 13 Drawing Sheets

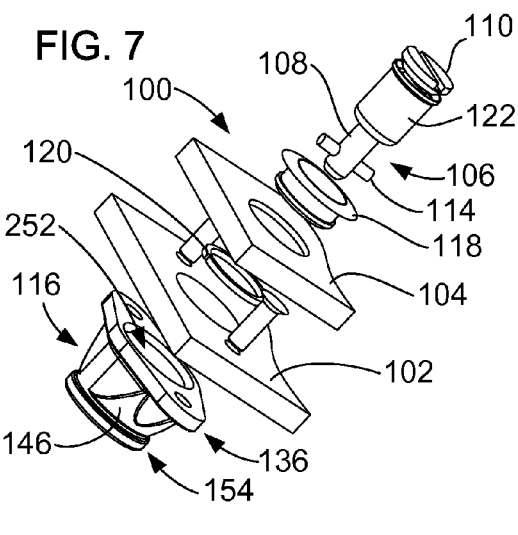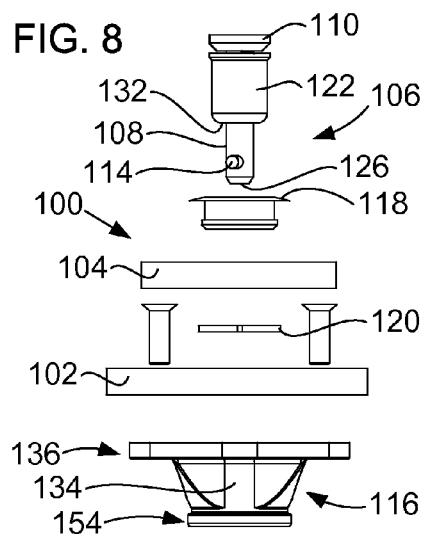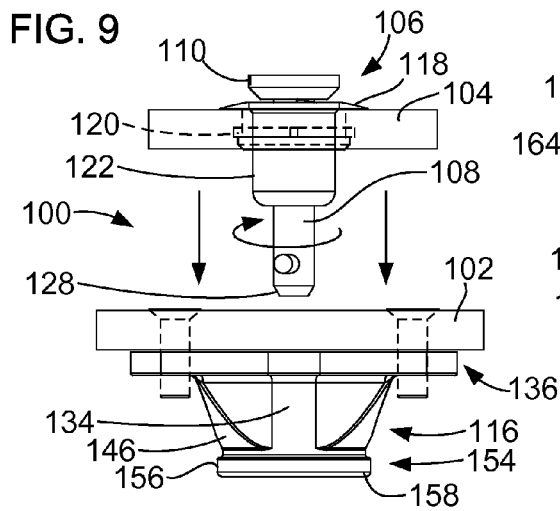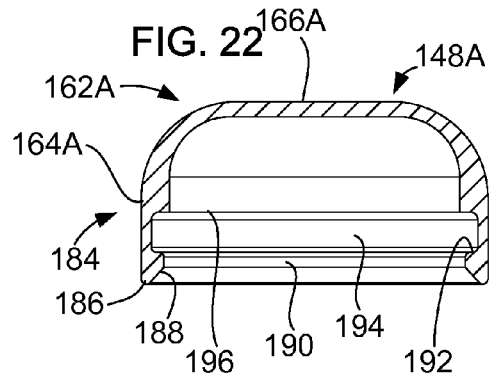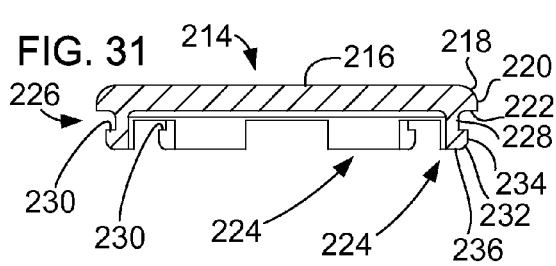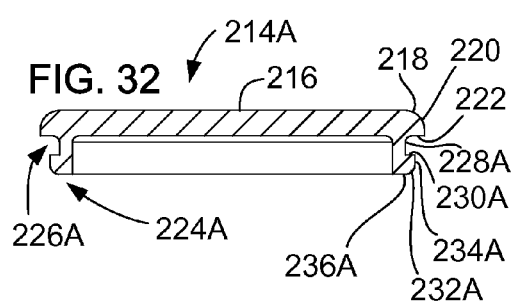

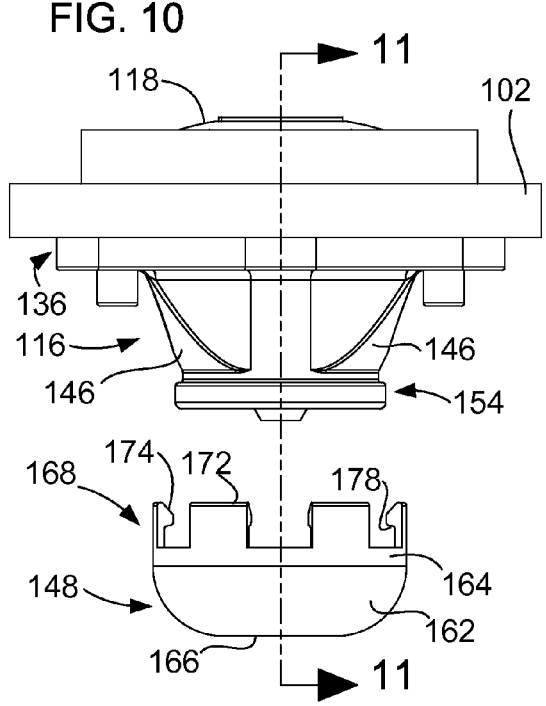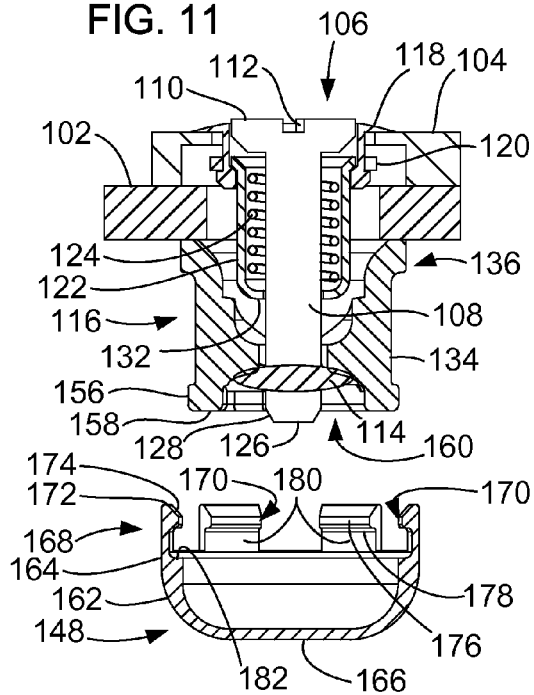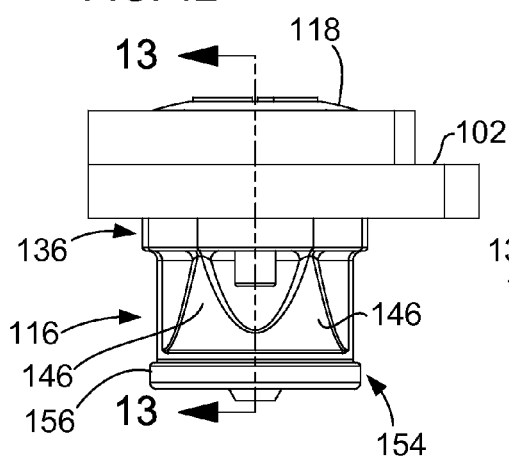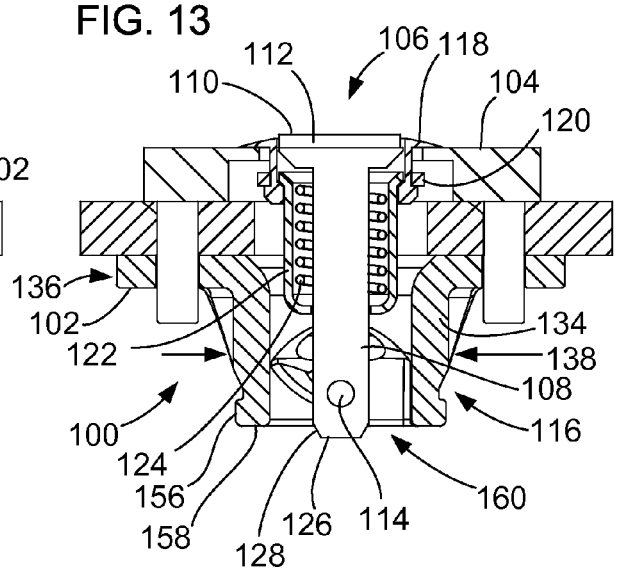

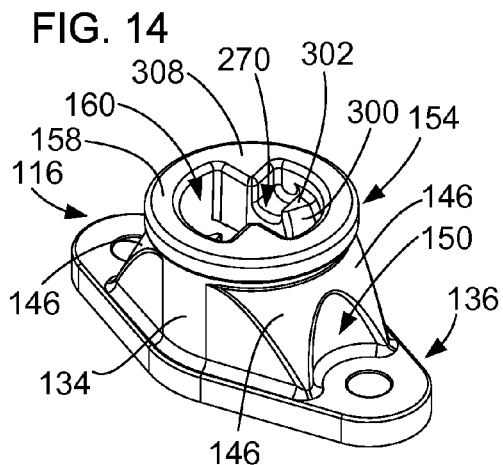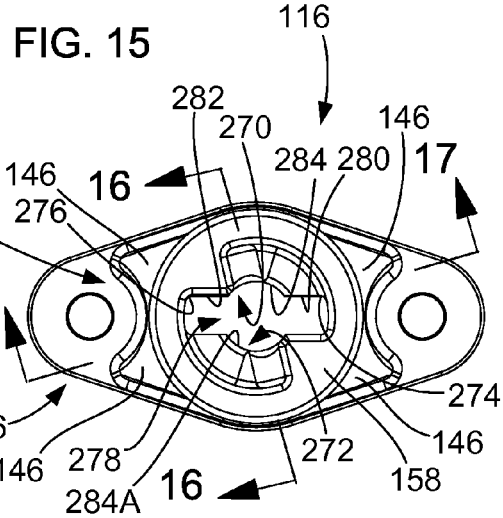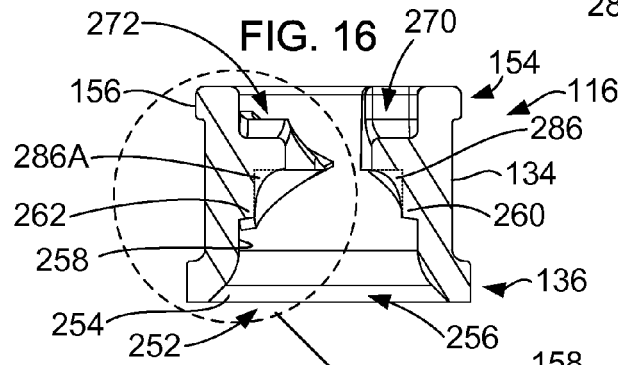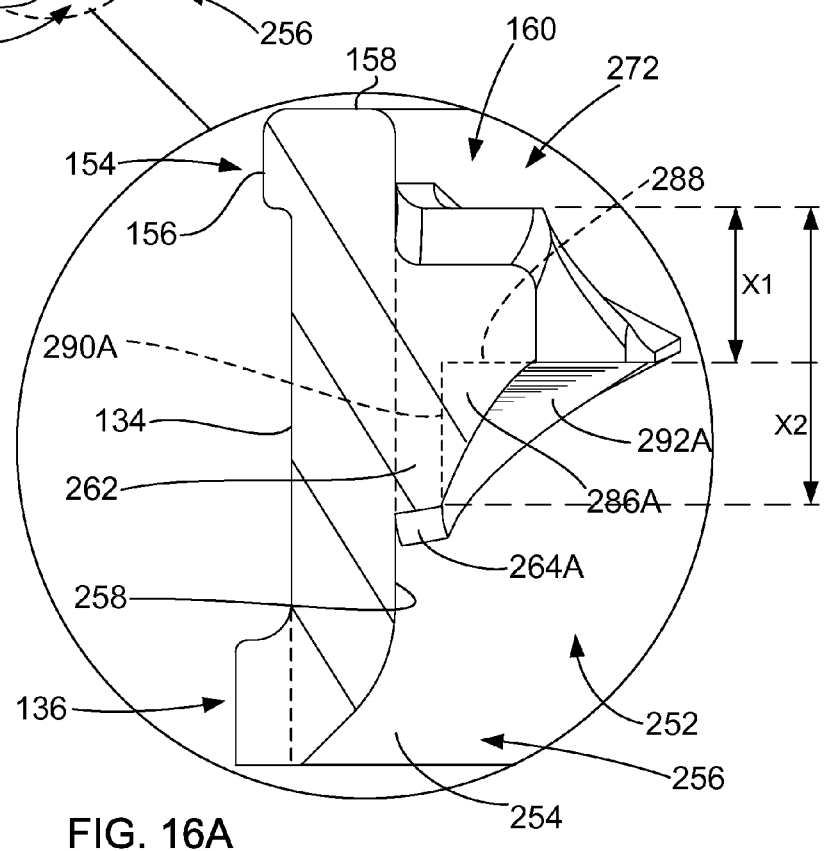

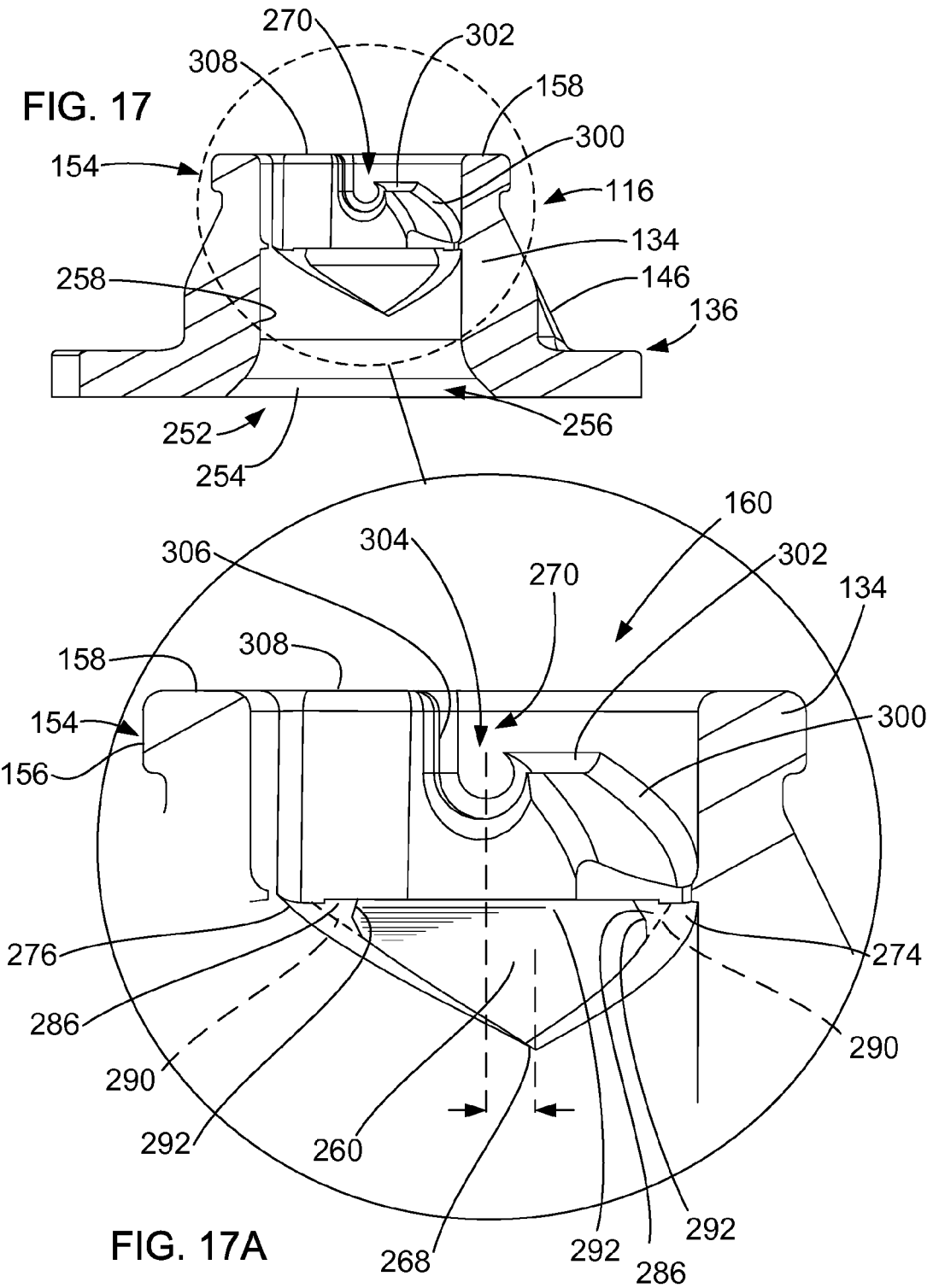

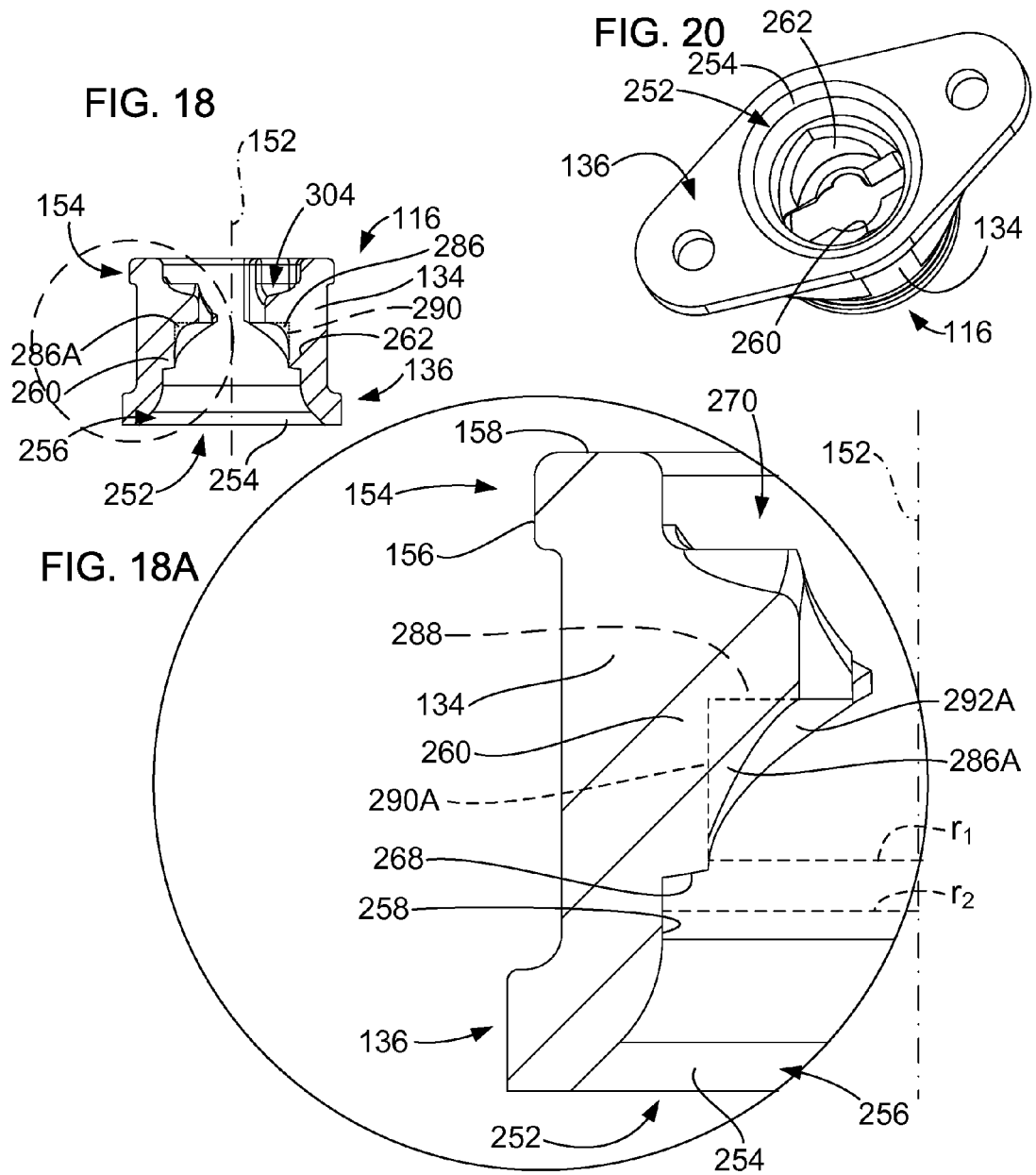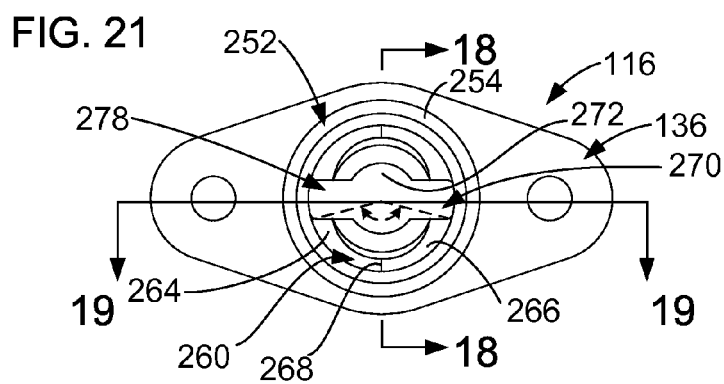

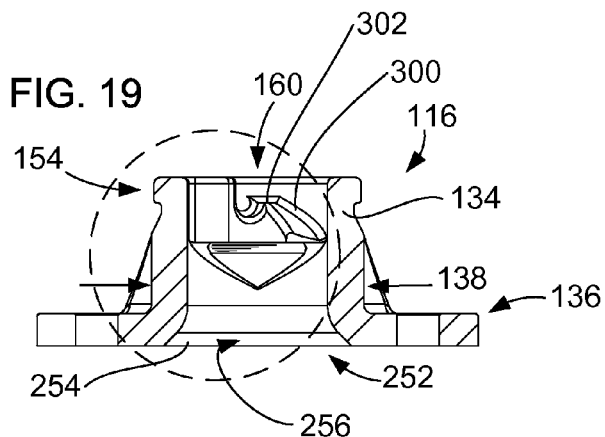
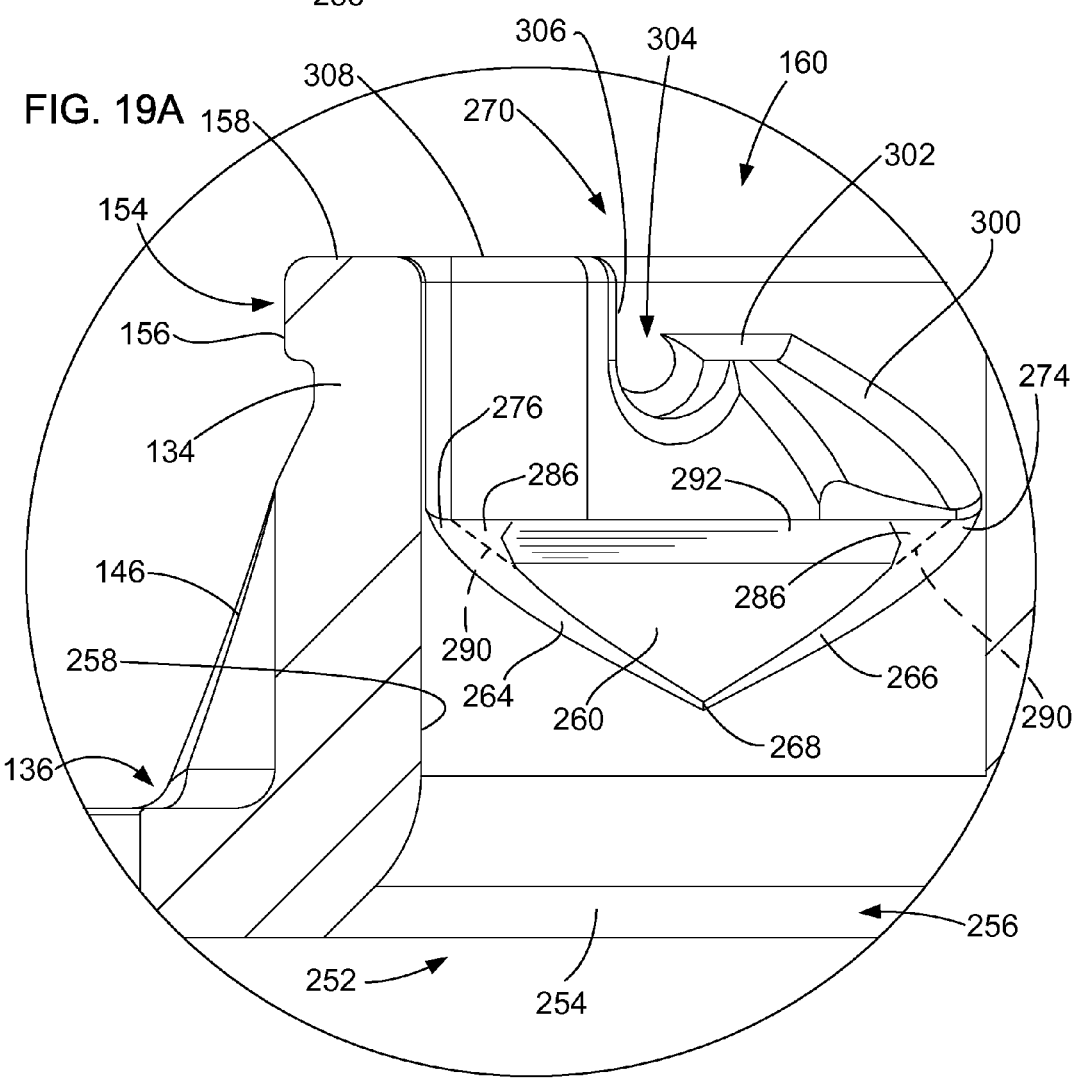

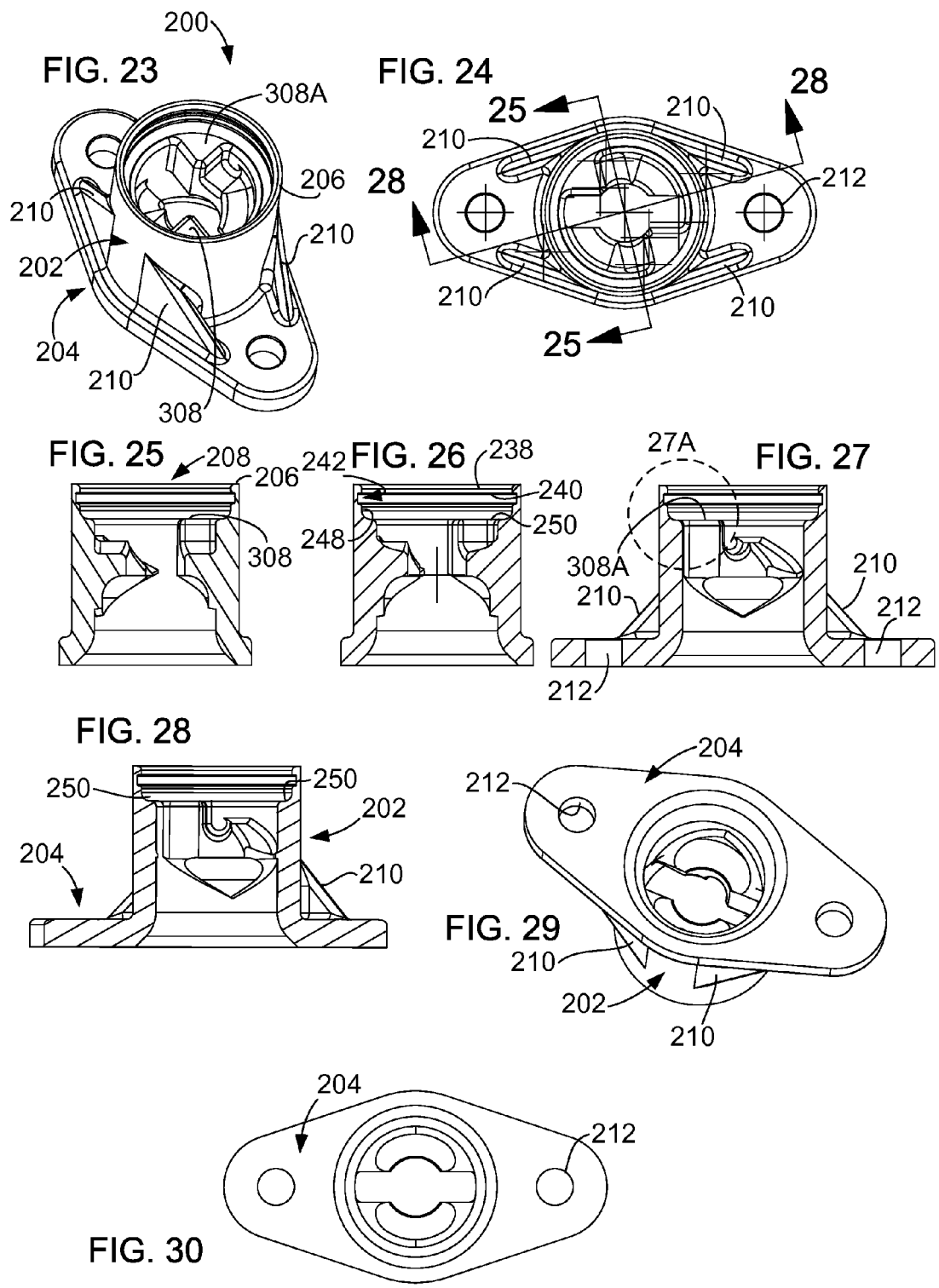

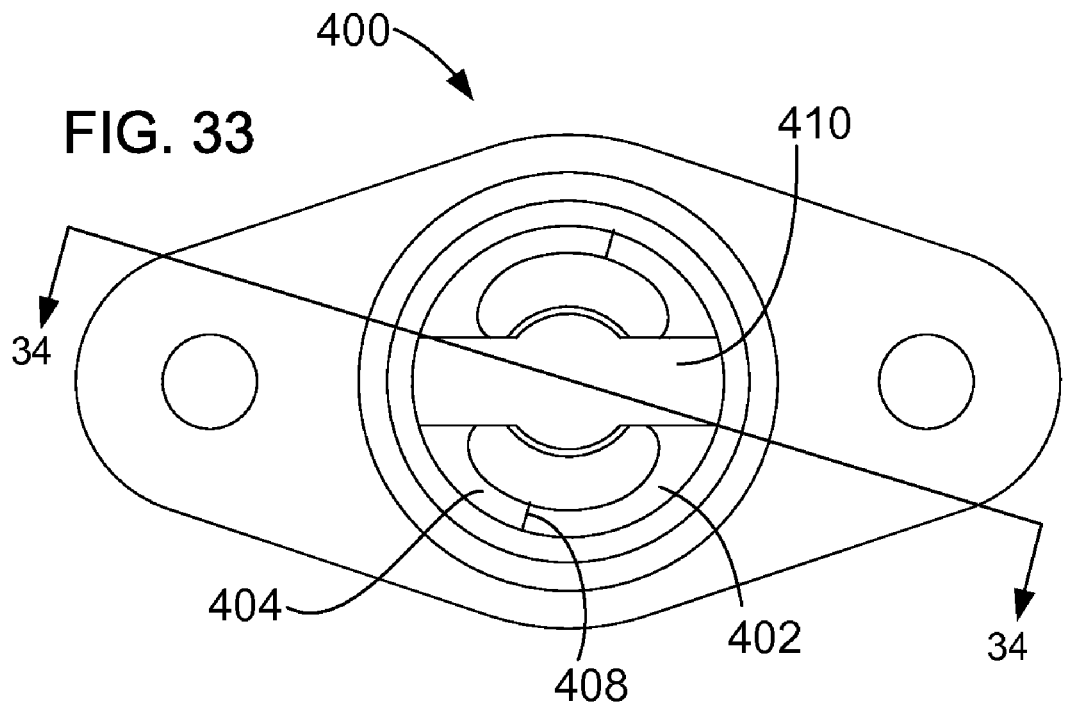
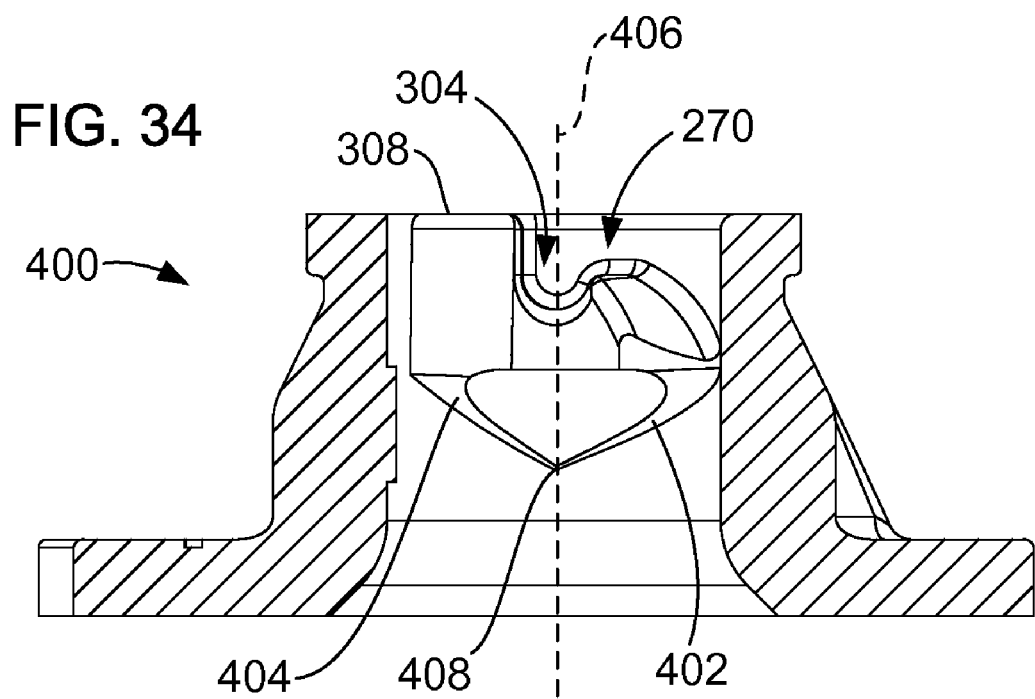

FASTENERS, FASTENER COMPONENTS AND FASTENER RECEPTACLES

BACKGROUND

1. Field

This relates to fasteners, fastener components and fastener receptacles, including quarter-turn fasteners for panels, covers, and other elements to be secured together.

2. Related Art

Many types of fasteners undergo significant stresses and loading during normal use. Normal use may involve high loads and significant vibration over extended periods. In critical applications, such as in aircraft and the like, the fasteners may be rated to withstand the loading and vibration significantly longer than for other applications, without compromising the securement.

In aircraft applications, the types and numbers of fasteners add significant weight to the final assembly. Panel fasteners, for example, have a number of parts, most or all of which are metal. Metal is used for strength, corrosion resistance and other factors. However, the metal parts add appreciable weight to the final assembly. If the weight of a given part could be reduced, because of the number of individual parts, even small weight reductions in an individual component may add up to a significant weight reduction overall. Additionally, some metal materials may still experience some corrosion and may also be incompatible with surrounding materials.

SUMMARY

Methods and apparatus can be used to provide an improved and reliable fastener, including a fastener that may give significant weight savings. The methods and apparatus may also allow easier manufacture of fasteners such as quarter turn panel fasteners, and possibly at a lower cost, while producing a part more resistant to corrosion, material incompatibility issues and other effects.

In one example of a fastener, an assembly incorporating a stud assembly and a receptacle assembly may include a body of a non-metal material having an internal wall and extending along an axis. The receptacle includes a first opening and a second opening with a non-circular passage way between the openings. In one configuration, the non-circular passage way is symmetric relative to the axis. A boss extends inwardly from an internal portion of the body and has a curved seat or recess for engaging a complementary surface on a portion of the stud assembly. The curved surface faces at least partly toward the second opening, and extends angularly about the axis a first angular distance. The boss includes a lower surface and a cam surface structure facing at least partly toward the first opening. In one example, the cam surface can follow a partly helical path along the internal portion of the body, and in another example, the cam surface can follow a less uniform path, for example with a changing or varied curvature. The cam surface structure has a portion facing the first opening and another portion facing the internal wall of the body opposite the cam surface structure. An interior structure extends between the lower surface of the boss and the cam surface structure, for example so that there is a curving transition between the lower surface of the boss and the cam surface structure. In another example, the interior structure between the boss and the cam surface structure has a significant portion of the junction between the boss and the cam surface structure meeting other than at right angles.

In another example of a fastener combination, the combination includes a fastener receptacle of a non-metal material and having first and second oppositely-facing openings. At least part of the body interior includes one or more structures that together define a non-circular passage between the first and second openings. In one configuration, the non-circular passage way is symmetric relative to an axis of the body. The structures defining the non-circular passage include retaining structures for retaining a fastener element or a stud of a stud assembly. Underneath the retaining structures, cam surface structures on a wall of the body interior extend upward to the retaining structures. One or more support structures extend inwardly from a junction between the cam surface structure and the underside of the corresponding retaining structure for supporting the underside of the retaining structure. A support structure, any support structure, or all of the support structures if desired and if there are more than one, can have a concave configuration relative to the axis of the body. Additionally, a support structure can be co-extensive with the corresponding retaining structure, less extensive than the corresponding retaining structure or more extensive than the corresponding retaining structure. Furthermore, a support structure can be continuous under the corresponding retaining structure, or a support structure can be spaced intermittent, whether uniform in size or non-uniform. In one example, the receptacle has two retaining structures, but can have a single retaining structure or multiple retaining structures. Each retaining structure can have a corresponding support structure in a manner described above.

In another example of a fastener element, a receptacle for a fastener assembly has a non-metal body extending along a central axis between a first opening and a second opening. The body can be cylindrical, square, rectangular, pyramidal, or other external shape. The body also includes an interior. First and second support structures extend from opposite sides of the inside of the body toward the central axis and define a non-circular opening on the axis between the first and second openings. The first support structure joins the inside wall of the body at a junction wherein at least part of the junction has an arcuate cross-section. The at least part of the junction is partially concave from the viewpoint of the central axis. In a further example, the second support structure also joins an inside wall of the non-metal body at a junction, at least part of which has an arcuate cross-section. At least part of the junction for the second support structure is partially concave from the viewpoint of the central axis. In a further example, the first and second support structures include respective cam surfaces terminating in respective retaining grooves for receiving a complementary component on a fastener body. The complementary component may be a cross pin on a fastener stud, or may have another configuration complementary to a retaining surface in the receptacle.

In a further example of a fastener element, a receptacle of a fastener assembly has a non-metal cylindrical (or other external-shaped) body extending along a central axis between a first opening and a second opening. One or more support structures extend from the sides of the inside of the body toward a central axis (for example central relative to the interior configuration of the body) defining a non-circular opening between the first and second openings. In one example, a non-metal cap may be placed over the second opening. The cap can be removable. The cap can be configured to engage an outside portion of the cylindrical body, or the cap can be configured to engage an inside portion of the cylindrical body. In another example, the receptacle can include a mounting surface for mounting the receptacle to a support surface. The mounting surface in one example may be a flange perpendicular to the cylindrical body, and in another example the mounting surface may include one or more openings for receiving fasteners for fixing the mounting surface to the support surface. Openings in the mounting surface can also be used with adhesive or other compound for bonding the mounting surface to its support surface. The openings can also receive flowable material into the openings for hardening and forming bonded or engagement areas for holding the body in place on a support surface. In another example, the fastener assembly is configured to limit, restrict or prohibit lateral movement of a fastener stud element, while permitting substantially only axial and rotational movement.

In another example, a fastener assembly includes a stud and a receptacle. The stud includes a shaft and an engagement portion, for example a cross pin, for engaging a portion of the receptacle. The receptacle engagement portion includes a seat portion for receiving the engagement portion of the stud. Where the stud engagement portion is a cross pin, the seat portion may be a groove or may be a partially circular channel in the receptacle. The receptacle engagement portion can be a recess in a surface of the receptacle, and the recess can have a shape complementary to the stud engagement portion, or otherwise. The receptacle includes a non-metal body having internal supports for the receptacle engagement portion, and the internal supports have reinforcement portions on sides of the supports opposite the receptacle engagement portion. The reinforcement can include one or more surfaces extending both other than axially of the receptacle and other than transversely of the receptacle (perpendicular to the axis of the receptacle). In one example, the reinforcement is concave relative to the receptacle axis, and in another example, the reinforcement has a cross-section that is partly circular. In another example, the reinforcement has a shape facing the axis that is complementary to a portion of a stud assembly. For example, a stud assembly could include a cup or housing for a bias element, and the shape of the reinforcement could complement the adjacent shape of the cup. Where the shape of the cup adjacent the reinforcement has a 90 degree corner, the reinforcement can also have a 90 degree cross-section, and where the shape of the cup adjacent the reinforcement is curved, the reinforcement can also be curved. Where the shape of the cup adjacent the reinforcement has a constant radius of curvature, curvature on the reinforcement can also have a constant radius.

In a further example, a fastener element in the form of a receptacle can have a non-metal body extending along an axis between first and second openings and includes a mounting element adjacent the first opening. The mounting element may include openings for receiving mounting fasteners or other securements for securing the receptacle to a support surface. The mounting element may also include one or more support walls extending outwardly of the body from the body to the mounting element. In one example, single support walls extend from opposite sides of the body, and in another example, pairs of support walls extend from opposite sides of the body. In a further example, the mounting element can include inserts, sleeves, eyelets or other elements helping to reliably secure the receptacle to the support surface. The inserts or other elements can be formed from a material harder than the receptacle, including metal.

In another example, a fastener element in the form of a receptacle has a non-metal body extending along an axis between first and second openings. Engagement portions extend from inside walls of the body toward each other, and are spaced from the first and second openings. The body includes a first wall extending from the engagement portions to the first opening and a second wall extending from the engagement portions to the second opening. The first and second walls each have a relatively constant thickness around a perimeter of the wall at a given axial position on the body. However, the first and second wall thicknesses can be but are not necessarily constant from one axial position on a wall to another. In one example, the second wall can include internal engagement surfaces, grooves or other surfaces for receiving complementary elements on a cap. In another example, the second wall can include external engagement surfaces, grooves or other surfaces for receiving complementary elements on a cap. The cap can also be non-metal, and can be formed from plastic, rubber, Neoprene or other suitable materials. Metal caps can also be accommodated. The first and/or second walls can be cylindrical, and they can be right circular cylindrical.

In another example, the cap and receptacle having structures as described in any of the foregoing examples could be molded as a single or multiple structure, where the cap would be connected to the receptacle by way of a living hinge, integral cord or line, or other connective design. In other examples, the cap may be attached to the receptacle by way of snap-on features, bonding, press fit, or vulcanizing.

In another example, the retainer and cap having structures as described in any of the foregoing examples could be molded as a monolithic structure, where the retainer structure is molded first and the cap structure is molded second, or vice versa. The receptacle and cap may be of the same material, or different materials. This molding process is commonly referred to in the injection molding industry as "Two-Shot Molding". The Two-Shot Molding process as defined in Robert A. Malloy's *Plastic Part Design for Injection Molding* is, " . . . essentially an in-mold welding or assembly process where one part is molded using one resin, and the second resin is molded onto the first part after a section of the tool retracts or the part rotates to a second larger cavity". Other fabrication methods can be used.

These and other examples are set forth more fully below in conjunction with drawings, a brief description of which follows.

BRIEF DESCRIPTION OF THE DRAWINGS

FIG. 7 is an isometric exploded view of the fastener and panel assembly of FIG. 3;

FIG. 8 is a side elevation view of the exploded assembly shown in FIG. 7;

FIG. 9 is a side elevation view depicting the movement of a panel fastener toward a fastener receptacle for securing two panels together;

FIG. 10 is a front elevation view of the fastener assembly of FIG. 1 with the cap removed from the receptacle;

FIG. 11 is a longitudinal cross-section of the assembly of FIG. 10;

FIG. 12 is a side elevation view of the fastener assembly of FIG. 3;

FIG. 13 is a longitudinal cross-section of the fastener assembly taken along line 13-13 of FIG. 12;

FIG. 14 is an upper isometric view of the fastener receptacle shown in FIG. 1;

FIG. 15 is a top plan view of the receptacle of FIG. 14;

FIG. 16 is a side longitudinal section of the fastener receptacle taken at an angle along line 16-16 of FIG. 15;

FIG. 16A is a detailed view of a portion of the receptacle shown in FIG. 16;

FIG. 17 is a front longitudinal section of the fastener receptacle taken at an angle along line 17-17 of FIG. 15;

FIG. 17A is a detailed view of a portion of the receptacle shown in FIG. 17;

FIG. 18 is a side longitudinal cross-section of the fastener receptacle taken along line 18-18 of FIG. 21;

FIG. 18A is a detailed view of a portion of the receptacle shown in FIG. 18;

FIG. 19 is a front longitudinal cross-section of the fastener receptacle taken along line 19-19 of FIG. 21;

FIG. 19A is a detailed view of a portion of the receptacle shown in FIG. 19;

FIG. 20 is a lower isometric view of an underside of the receptacle of FIG. 15;

FIG. 21 is a bottom plan view of the receptacle of FIG. 15;

FIG. 22 is a longitudinal cross-section of an alternative cap for use with the receptacle of FIG. 1;

FIG. 23 is an upper isometric view of another fastener receptacle;

FIG. 24 is a top plan view of the fastener receptacle of FIG. 23;

FIG. 25 is a side sectional view of the receptacle of FIG. 23 taken at an angle as shown by line 25-25 of FIG. 24;

FIG. 26 is a side sectional view of the receptacle FIG. 23;

FIG. 27 is a front sectional view of the receptacle of FIG. 23;

FIG. 28 is a front sectional view of the receptacle of FIG. 23 taken at an angle as shown by line 28-28 of FIG. 24;

FIG. 29 is a lower isometric view of the underside of the receptacle of FIG. 23;

FIG. 30 is a bottom plan view of the receptacle of FIG. 23;

FIG. 31 is a side sectional view of a cap for use with the receptacle of FIG. 23; and FIG. 32 is a side sectional view of a cap for use with the receptacle of FIG. 23.

FIG. 33 is a bottom plan view of another example of a receptacle;

FIG. 34 is a vertical section of the receptacle of FIG. 33 taken along line 34-34;

DETAILED DESCRIPTION

Figure 1:
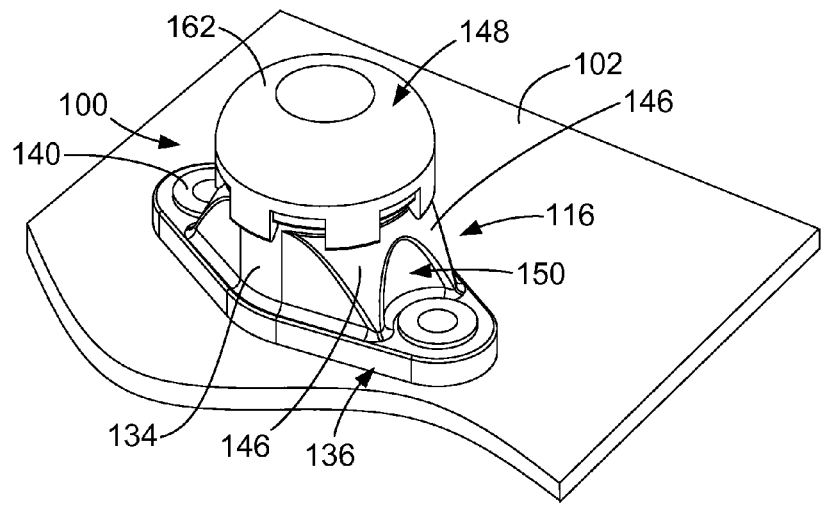
FIG. 1 is an upper isometric view of a fastener assembly in the form of a quarter turn fastener assembly holding two panels together.
Figure 2:
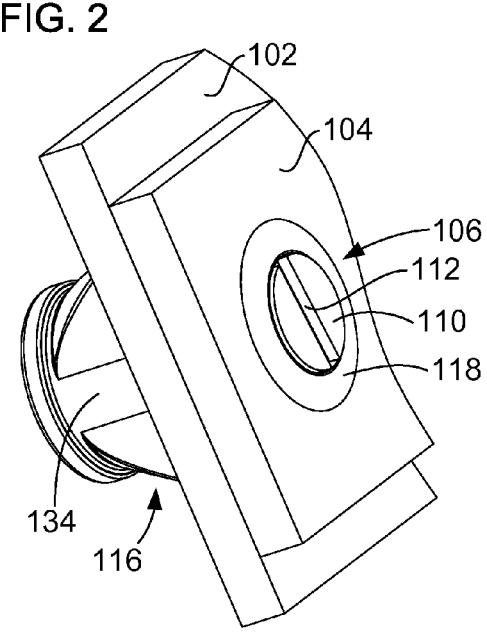
FIG. 2 is a lower isometric view of the fastener assembly of FIG. 1.
Figure 3:
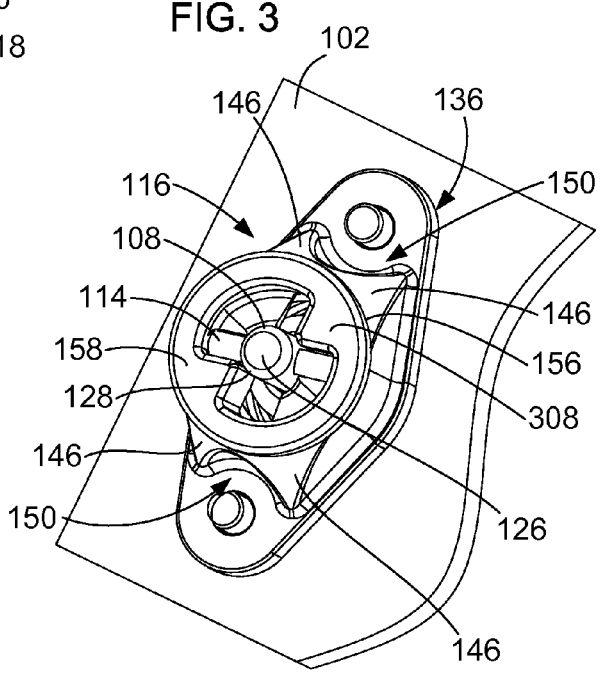
FIG. 3 is an upper isometric view of the fastener and panel assembly of FIG. 1 with a cap removed.

This specification taken in conjunction with the drawings sets forth examples of apparatus and methods incorporating one or more aspects of the present inventions in such a manner that any person skilled in the art can make and use the inventions. The examples provide the best modes contemplated for carrying out the inventions, although it should be understood that various modifications can be accomplished within the parameters of the present inventions.

Examples of fasteners and of methods of making and using the fasteners are described. Depending on what feature or features are incorporated in a given structure or a given method, benefits can be achieved in the structure or the method. For example, fasteners using non-metal receptacles may be lighter in weight and may provide certain improvements in performance characteristics, such as wear-resistance, endurance and tensile strength, than conventional quarter turn fasteners. They may also demonstrate better corrosion resistance, or material compatibility characteristics, for example.

These and other benefits will become more apparent with consideration of the description of the examples herein. However, it should be understood that not all of the benefits or features discussed with respect to a particular example must be incorporated into a fastener, component or method in order to achieve one or more benefits contemplated by these examples. Additionally, it should be understood that features of the examples can be incorporated into a fastener, component or method to achieve some measure of a given benefit even though the benefit may not be optimal compared to other possible configurations. For example, one or more benefits may not be optimized for a given configuration in order to achieve cost reductions, efficiencies or for other reasons known to the person settling on a particular product configuration or method.

Examples of a number of fastener configurations and of methods of making and using the fasteners are described herein, and some have particular benefits in being used together. However, even though these apparatus and methods are considered together at this point, there is no requirement that they be combined, used together, or that one component or method be used with any other component or method, or combination. Additionally, it will be understood that a given component or method could be combined with other structures or methods not expressly discussed herein while still achieving desirable results.

Quarter turn fasteners are used as examples of a fastener that can incorporate one or more of the features and derive some of the benefits described herein, and in particular panel fasteners. Fasteners other than quarter turn fasteners and fasteners for structures other than panels can benefit from one or more of the present inventions.

It should be understood that terminology used for orientation, such as front, rear, side, left and right are used herein merely for ease of understanding and reference, and are not used as exclusive terms for the structures being described and illustrated.

One example of a fastener assembly 100 (FIGS. 1-9) can be used to fasten together a panel 102 and a cover 104. The panel and cover can be part of an aircraft structure, such as a wing portion or a fuselage section with a cover over an access area, or other structures where two elements such as panels are to be brought securely together. Other applications are also possible.

In the present examples, the fastener assembly will be considered as having two sub assemblies, the first sub assembly being the male portion having a conventional stud assembly, described more fully below. The second sub assembly is the female portion of the fastener assembly and includes a receptacle for receiving a portion of the first sub assembly for securing the two sub assemblies together. However, the first sub assembly is considered conventional, and can take any number of configurations suitable for engaging the second sub assembly including the receptacle.

The first sub assembly includes a stud assembly 106 (FIGS. 6-9) mounted to the cover 104. The stud assembly includes a shank 108 manipulated through a head portion 110 having a slot 112 or other suitable surface for receiving a driving tool. The stud includes an engagement portion, in the present example a cross pin 114, for engaging a portion of the receptacle 116, described more fully below.

| For a 1142 Series assembly (see FIG. 6): B is calculated as follows: B = .63 + (.030 × Dash No.) | | |
|---|---|---|
| If T = thickness | Then Dash No. = | And B = |
| .081-.110 | 2 | .69 |
| .111-.140 | 3 | .72 |
| .141-.170 | 4 | .75 |

The above example, formula and reduced table provide information to determine the overall stud assembly 106 length "B" for any given total application thickness "T"; which is the sum of a first structure 104 thickness "T1" and a second structure 102 thickness "T2". The stud assembly 106, which includes the cross pin 114, locates the cross pin at a distance from the end 126 of the shank 108, and this location remains constant regardless of the length of the stud or the application thickness. To calculate a desired stud assembly 106 length B, which correlates to a basic part number, and for an application thickness T, the specific dash number, the above formula and table can be applied. This formula and table represents one series, type and size of stud assembly with its corresponding size of receptacle 116. Also, the formula and table currently presented may be different for other series, types and sizes of stud assemblies 106 and corresponding series, sizes and types of receptacles 116. This data is presented only for illustrative purposes as it relates to the normal usage and relative dimensions of the present examples for one series, size and type of fastener assembly 100 for the desired use, but is not intended to be limiting in the scope of series, sizes, types, or special conditions relating to designs or dimensions of the stud assembly 106 or matching size or type of receptacle 116. Other formulas, dimensions and tables can be used for other series, sizes or types of fastener assemblies 100.

The stud assembly is secured in a cavity in the cover 104 through a grommet 118 sandwiching the cover with a retaining ring 120. A cup 122 is seated against the grommet and houses a spring or other bias element 124. The spring 124 presses against the head of the stud and the bottom of the cup 122 to bias the stud outward of the cup.

In the configuration shown within the drawings, the shank 108 of the stud assembly 106 is substantially cylindrical between the head 110 and an end 126. The end 126 may have a slight bevel 128 around the perimeter of the end 126. The cross pin 114 is centered on and extends to each side of the shank 108. The cross pin 114 and the shank 108 are typically formed from metal, as are the remainder of the components of the stud assembly 106. Additionally, the cross pin is substantially a right circular cylinder with relatively smooth surfaces so that the cross pin can slide easily over adjacent surfaces of the receptacle.

The cross pin 114 has an outer configuration that is complementary with receiving surfaces in the receptacle assembly. For ease of manufacturing and use, the external accessible surfaces of the cross pin 114 coming into contact with these surfaces on the receptacle have a circular cross-section. With this configuration, the cross pin 114 will normally contact the surfaces 264 or 266 along tangential lines (a tangential line being comprised of points that are tangent to the surface of the cross pin combining to form a line along that surface of the cross pin contacting the adjacent surfaces 264/266) at each degree of rotation and incremental axial distance. These contacting portions of the cross pin slide easily along these cam surfaces on the receptacle (described more fully below). The cross pin 114 can have other profiles, such as might complement a seat or recess in the receptacle that receives the cross pin. However, in the present examples, the profile of the cross pin 114 is determined by the shape of the recess or seat so as to be complementary to the recess or seat.

The cup 122 typically is also right circular cylindrical between a flared end 130 and the opposite, closed end 132 of the cup. The closed-end 132 has an outer surface with a substantially constant radius in a transition between the cylindrical cup body and the end 132 of the cup 122. The spring 124 extends between the underside of the head 110 and the bottom of the cup.

The receptacle 116 can have a number of outer configurations. In the example shown in FIGS. 1-21, the receptacle includes a body 134 extending upward away from the panel 102, and a mounting element 136 extending outwardly from at least part of the receptacle body 134. In the present examples, the outer surface of the body is substantially cylindrical over most of its axial length, and may be considered to have a perimeter with an outer boundary defined by the vertical portion of the receptacle, such as is indicated at 138 in FIGS. 13 and 19. The mounting element extends outwardly from the perimeter of the body. In FIGS. 13 and 19, the mounting element 136 extends a significant distance in opposite directions, such as along the line defined by line 19-19 in FIG. 21. In the perpendicular direction, the mounting element 136 extends a smaller distance from the body, such as along the line defined by the line 18-18 in FIG. 21. The mounting element 136 may extend from the body of 134 to a greater or lesser extent, the extent of which may be determined by the desired amount of mounting surface area for the receptacle, and any lateral support (if any) that may be desired for the receptacle.

Figure 4:
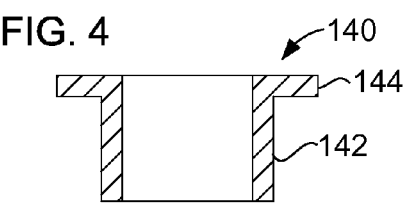
FIG. 4 is a longitudinal sectional view of an insert in the form of an eyelet for use with the fastener assembly of FIG. 1.
Figure 5:
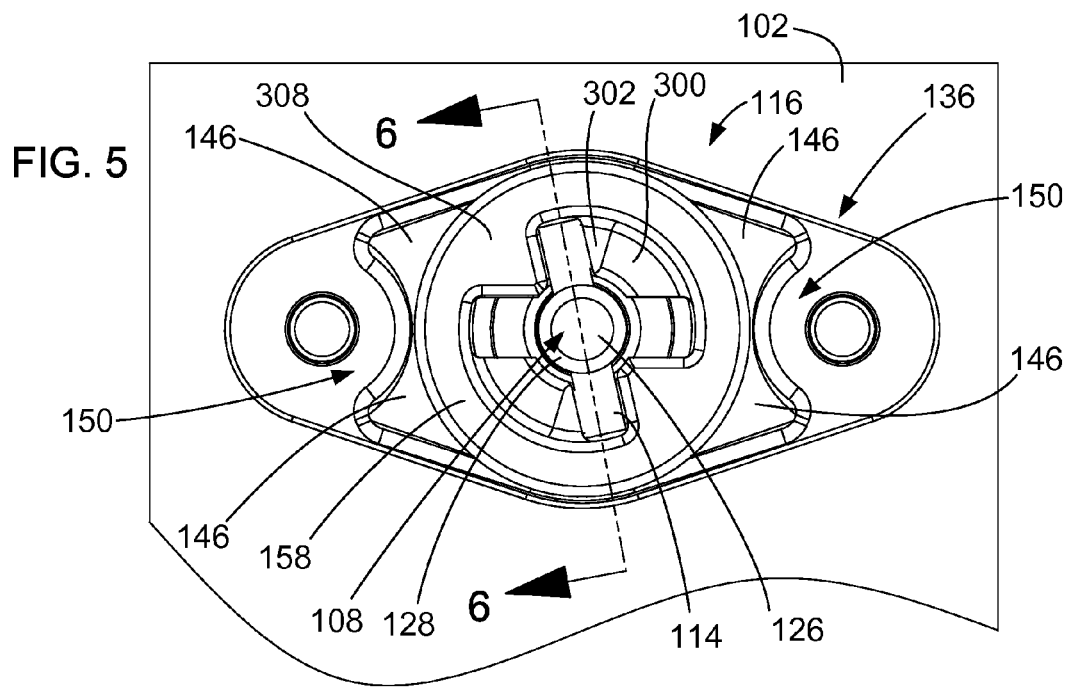
FIG. 5 is a top plan view of the fastener assembly shown in FIG. 3.
Figure 6:
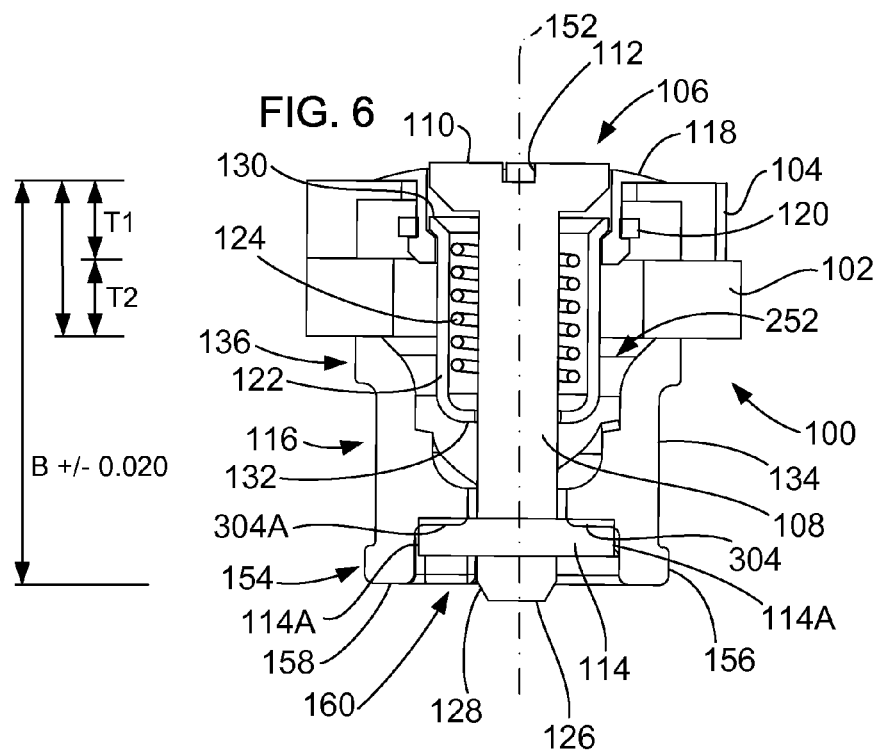
FIG. 6 is a longitudinal cross-section through the fastener assembly taken along line 6-6 of FIG. 5.

The mounting element 136 can be a mounting plate, mounting flange, planar member, tab or tab combination, a plurality of wings, or other surfaces on the body. In the present examples, the mounting element is a substantially planar plate member extending on opposite sides of the body. The mounting element 136 includes structures for mounting the plate to a supporting member. In one example, the structure includes openings for receiving respective eyelets 140 (FIGS. 1 and 4). The eyelets can receive respective fasteners, for example rivets, threaded fasteners, and the like, or they can be used to help hold adhesives, films, double-stick tape or other pressure sensitive adhesives, or other bonding elements relative to the receptacle and for holding the receptacle onto the panel 102. In the examples of bonding agents or adhesives that might be flowable, such material may extend into the openings, may extend over the upper edges of the openings, and may also extend over part or all of the upper surfaces of the mounting element 136. Contact of the material with the adjacent surface(s) of the receptacle help to hold the receptacle in place. Engagement between the material and the adjacent edges of the receptacle help to hold the receptacle in place. The eyelets 140 (FIGS. 1 & 4) may be used in or around the openings to help resist loading forces that may be experienced through the receptacle when held in place through the mounting fasteners. The upper surface of the mounting element 136 is substantially flat, but other surface configurations can be used. Where adhesives, films, double-stick tape or other pressure sensitive adhesives, or other bonding elements are used, openings can also be omitted, with the bonding element holding the receptacle to the support surface through an appropriate bonding surface on the receptacle.

In another example, a receptacle mounting element 136 can incorporate a smooth or non-smooth surface 136A adjacent to the intended support surface. A non-smooth surface can be textured, roughened, knurled, abraded, peened, inclusive of one or more projections or depressions, or otherwise descriptive. This non-smooth surface condition may improve the strength characteristics when joined to the support surface, particularly when the receptacle 116 is bonded to the support structure of the panel 102 described above. The improved strength characteristics relate to the effectiveness of the attachment method of the receptacle with the intended support surface, which can include but is not limited to; peel, push-out, torque-out, and incidental jarring or hitting (with another object) of the attached receptacle.

The eyelets 140 in the examples shown have a cylindrical body 142 and a rim or shoulder 144. The cylindrical body 142 and the rim 144 help to distribute loading applied through the receptacle and separate the fastener from the underlying receptacle material.

In another example, the openings receive adhesive from between the mounting element 136 and the underlying panel to help secure the receptacle in place. The openings or included eyelets can also receive other elements for helping to fix the receptacle in place, including other elements already fixed to the panel. These may include dowel pins, rivets or screws, or a combination thereof.

The receptacle 116 may include reinforcement between the receptacle body 134 and the mounting element 136. In one example, the reinforcement includes one or more walls 146 extending from the body to the mounting element (FIG. 1). The walls 146 contact a significant portion of the height of the body, for example from a point adjacent to mounting element 136 to a level near the opposite end of the receptacle. In the examples shown in FIGS. 1-22, the walls 146 extend to a height just below a cap 148, described more fully below. In other configurations, the walls 146 can extend to a lower height. The walls extend outwardly and terminate away from the receptacle body to the mounting element 136. In the example shown in FIGS. 1-22, the walls 146 extend longitudinally partway to the eyelet 140. The horizontal length of a given wall can be selected as a function of the desired strength for the body. The angle of descent of a wall from the upper portion to the mounting element is substantially straight as shown in FIG. 10, but can vary along the length of the wall surface.

The thickness of a given wall can be selected as desired, for example based on the desired strength for the body. In the present example shown in FIGS. 1-22, the wall extends transversely from one side of the mounting element to the other while leaving a recess 150 to accommodate the eyelet 140 and a corresponding fastener such as a rivet or screw. In the present example, the receptacle has one wall extending from the body toward each eyelet. In other examples, the wall or walls can be thinner than the width of the mounting element and can be positioned at a number of locations around the body. For example, a wall or walls can extend on a radius of the receptacle body, aligned with a chord of the receptacle body where the receptacle body is approximately circular, aligned with a tangent, or a number of other directions. In other examples, the wall can be planar, other geometric shapes or non-specific. One configuration has a pair of planar walls disposed on opposite sides of the receptacle body aligned with a longitudinal plane through the center and through the eyelets. The planar walls are approximately triangular in side view extending from just below the cap 148 to the mounting element at a point part way between the receptacle body and the respective eyelet.

The receptacle body 134 of the receptacle 116 extends along an axis 152 (FIG. 6) substantially perpendicular to the panel 102. The outside of the receptacle body is substantially symmetrical about the axis, and the body portion above the mounting element 136 is substantially cylindrical, apart from the external reinforcement. The body extends upwardly away from the mounting element 136 to an upper rim 154, the configuration of which in the present examples depends on the type of cap to be used with the receptacle. In the examples shown in FIGS. 1-22, the cap 148 engages an external surface on the receptacle body. The upper rim 154 includes a substantially circular lip 156 extending around the circumference of the receptacle body. A portion of the cap 148 engages the lip 156 to hold the cap in place.

The end of the receptacle body opposite the mounting element 136 terminates at an end face 158, which defines a second opening 160 in the receptacle. When a cap is used, such as the removable cap 148, the cap covers the second opening 160.

In the configuration of the cap shown in FIGS. 1 and 10-11, the cap 148 has a shape conforming to the external shape of the receptacle body 134. A closed portion of the body 162 includes a circular rim 164 curving to join a substantially flat top 166. Cap mounting elements 168 extend axially from the circular rim 164 for engaging the lip 156 of the body. The cap mounting elements include engagement elements 170 for engaging the lip 156 on the receptacle body. The cap mounting elements 168 in the example shown in FIGS. 1 and 10-11 are discrete (as opposed to continuous) engagement arms distributed uniformly around the circular rim 164. The engagement elements are separated from each other by open spaces. Each engagement element 170 includes an end face 172, a ramp face 174, a sliding face 176 and a substantially radial wall 178 for engaging the underside surface of the lip 156. Axial walls 180 face and may engage the outwardly-facing circumferential surface of the lip 156. A shoulder wall 182 forms a continuous surface coming into contact with the end face 158 of the receptacle body. The shoulder wall 182 limits how far the cap 148 can slide over the end of the receptacle body.

The cap 148 can be formed from a plastic, including for example a structural plastic such as TORLON, other polyamide-imides or similar polymers can be used. Other polymers may include, among others, Vespel or Aurum (PI), Ultem (PEI), Victrex or Ketaspire (PEEK), Primospire (SRP), Polycarbonate, or Epoxide or Phenolic synthetic resins, or softer plastics. The material can also be a composite material and may include fiber reinforcement or other strengthening materials. Other materials, including metals or elastomers or any combination thereof may be used, but plastics are relatively easier to manufacture. Metal films may also be applied to underlying non-metal materials.

In another example of a cap, a cap 148A (FIG. 22) includes a closed body portion 162A having a circular rim 164A joining a substantially flat top 166A. A substantially continuous cap mounting element 184 terminates in a circular end face 186. A ramp surface 188 slants inwardly toward the interior of the cap to an axial surface 190. The axial surface 190 extends between the ramp surface 188 and a radial engagement wall 192 for engaging the underside of lip 156. An axial wall 194 faces and may engage the outwardly-facing circumferential surface of lip 156. A shoulder wall 196 forms a continuous surface coming into contact with the end face 158 of the receptacle body for limiting how far the cap 148A slides over the end of the receptacle body.

The cap 148A can also be formed from a plastic. In the present example, the material preferably provides a cap that is slightly flexible so that the open end of the cap can be manually placed over the receptacle body without requiring excessive force. Example materials include rubber, rubber-like materials and other elastomeric materials generally softer than the structural plastics that might be used to make the cap 148. Example materials can include Nitrile rubber, Teflon, Silicone or Fluorosilicone, Viton, Kalrez, Santoprene TPEs, or other acceptable materials determined by specific applications.

In another example of an outer configuration for a fastener receptacle FIGS. 23-30, the receptacle 200 includes a body 202 supported by a mounting element 204 substantially the same as the mounting element 136 described above. The body 202 extends upwardly away from the mounting element 204 and has an outer wall surface that is substantially right circular cylindrical above the mounting element. The outer wall terminates at an end face 206. The end face helps define a second opening 208 to the inside of the receptacle, described more fully below.

The receptacle 200 includes reinforcement between the receptacle body 202 and the mounting element 204. The reinforcement in the present example is a plurality of walls 210 extending from respective parts of the receptacle body 202 to the mounting element 204. Each of the walls is substantially triangular in side view. The wall supports the receptacle body 202 along an area of contact extending upward from the mounting element 204 at least partly to the end face 206. In the examples shown in FIGS. 23-28, the walls extend upwardly from the mounting element approximately half the height of the receptacle body. Each wall extends substantially adjacent and parallel to the respective edge of the mounting element 204, from the point of engagement with the receptacle body at a longitudinal position past the beginning and almost to the middle of the corresponding eyelet opening 212. Each wall extends approximately tangent to the receptacle body. Additionally, it will also be seen below that the walls 210 engage the receptacle body 202 in the same area as the recesses for the cross pins 114 are located inside the receptacle body. As shown in the drawings, the free side of each wall is substantially straight, and the thickness of that portion of each wall not in contact with another portion of the receptacle is substantially constant. Also as shown in the drawings, the present configuration of the receptacle 200 includes two pairs of walls, one pair on each extended portion of the mounting element 204. Each pair is configured so that an appropriately-sized fastener can be easily accommodated through respective eyelets 212.

The receptacle shown in FIGS. 23-28 may also include a cap such as those shown in FIGS. 31 and 32. As shown in FIG. 31, a cap 214 is configured to engage the inside of a receptacle body such as that shown in FIGS. 23-29. The cap includes a relatively flat disk 216, substantially circular in plan view with a curved edge 218. The curved edge terminates in a relatively flat side wall 220, forming a cover wall 222 that contacts the outward-facing end surface 206 of the receptacle body. The cap 214 includes a plurality of engagement elements 224 extending substantially perpendicular to the underside of the cap 214. The engagement elements 224 engage complementary surfaces on the inside of the receptacle body 202 to help hold the cap in place on the receptacle body. The engagement elements 224 are relatively evenly distributed about the perimeter of the cap, and are separated by openings between them. Each engagement element 224 includes a respective groove 226 defined on one side by the cover wall 222, by a radially outward facing wall 228 and by an engagement wall 230. Each engagement element 224 includes a ramp surface 232 between an outer wall 234 and a bottom wall 236.

In another configuration, a cap 214A (FIG. 32) has a relatively flat disk 216, also substantially circular in plan view with a curved edge 218. The curved edge terminates in a relatively flat side wall 220, forming a cover wall 222 that contacts the outward-facing end surface 206 of the receptacle body. The cap 214A includes a continuous engagement element 224A extending substantially perpendicular to the underside of the cap 214A. The engagement element engages complementary surfaces on the inside of the receptacle body 202 to help hold the cap in place on the receptacle body. The engagement element 224A includes a groove 226A defined on one side by the cover wall 222, a radially outward facing wall 228A and an engagement wall 230A. The engagement element 224A includes a ramp surface 232A between an outer wall 234A and a bottom wall 236A.

The cap 214 can be formed from a plastic, including for example a structural plastic such as TORLON, or other similar plastics, or softer plastics. Other materials may be used, just as with the cap 148. The cap 214A can also be formed from a plastic, as with the cap 148A. The cap is preferably slightly flexible so that the open end of the cap can be manually placed over the receptacle body without requiring excessive force. Example materials include rubber, rubber-like materials and other materials generally softer than the structural plastics that might be used to make the cap 214.

The caps 214 and 214A cover the second opening 208 of the receptacle body 202 and the engagement elements engage complementary surfaces on the interior of the body. The end face 206 of the receptacle body 202 is substantially circular and helps to define the circular second opening 208 along with an inwardly curving ramp surface 238 (FIGS. 25-27A). The ramp surface 238 terminates at a radially outwardly extending engagement wall 240, which defines one wall of an engagement groove 242 receiving the engagement elements 224/224A of the cap. The engagement groove 242 has a base wall 244, which is on an interior side opposite the outer surface of the receptacle body 202, and a side wall 246, which is substantially opposite the engagement wall 240. The groove 242 and the ramp surface 238 are formed into the interior side wall of the receptacle body. They are substantially circular and receive and retain either of the complementary caps 214 and 214A. The caps help to protect the interior of the fastener assembly from debris, and liquid splashing or soaking.

In other examples that are not illustrated, the cap can be screwed-on, pushed and turned on and possibly off, or popped on and possibly popped off. The receptacle 116 would have corresponding features to affix the cap for these alternative methods. These alternatives may be useful when the fastener assembly 100 is fastened in the application, and there is an ability and need to inspect or examine the receptacle 116 and stud assembly 106 by gaining access to the opening defined by the end face 158.

An axially extending wall 248 (FIG. 27A) defines a bore between the second opening 208 and the interior structures of the receptacle body, described more fully below. The bore is preferably substantially circular and has approximately the same internal diameter as the inside of the ramp surface 238. The wall 248 terminates at an inwardly-curving end wall 250. The end wall 250 forms the end of the internal support structures (described more fully below) in the axial direction for the recess receiving a cross pin of the stud assembly.

In the examples of the fastener receptacle described herein, the interiors of the receptacles 100 and 200 are substantially identical except for the structures for receiving and retaining the caps 214/214A. In the description of the interior structures for the receptacle bodies, the structures will be described with reference to FIGS. 1-21. However, it will be understood that the example of the receptacle described with respect to FIGS. 23-32 has the same interior structures, and receives and retains a fastener stud assembly in the same manner as the receptacle 100. While the interior structures can be different as between the receptacles 100 and 200, the present receptacle configurations having the same interior structures are suitable for receiving the stud assembly described herein.

The receptacle 100 includes interior structures for guiding, receiving and holding portions of a stud assembly within the fastener receptacle. The interior structures are formed interior to the receptacle body 134 between a first opening 252 and the second opening 160 introduced above.

The first opening 252 is defined by an inwardly curving wall 254 (see for example FIGS. 16 & 16A) extending axially along the axis 152 from the first end portion 256 of the receptacle body. The first end portion 256 is interior to the adjacent portion of the mounting element 136. The inside diameter (or cross sectional area in the case of a non-circular interior) of the curving wall 254 decreases gradually from the opening 252 to an internal right circular cylindrical wall 258 forming the inside surface of the receptacle body 134. The curving wall 254 and the cylindrical wall 258 guide the shank and cross pin of the fastener stud assembly into the receptacle body. It is noted that the receptacle body can be considered as positioned inside a circular or other-shaped opening in the mounting element 136. The combination of the receptacle body and the mounting element can also be considered as having the receptacle body above the mounting element with the curved surface 254 being formed in the mounting element 136. Other combinations are also possible.

The receptacle body 134 includes a first cam surface structure 260 on the internal cylindrical wall 258 of the body (FIG. 16). Typically, a receptacle body will have first and second cam surface structures 260 and 262, each formed or otherwise made part of the internal cylindrical wall 258. Each point on the first cam surface structure 260 finds an identical point diametrically opposite on the second cam surface structure 262. Therefore, the first and second cam surface structures are symmetric with respect to the axis 152. Hereafter, only the first cam surface structure 260 will be described in detail.

The first cam surface structure 260 includes first and second cam surfaces 264 and 266. It should be noted that FIGS. 16 and 16A show a first cam surface 264A for the second cam surface structure 262 based on the orientation of the section taken along line 16-16 in FIG. 15. The first and second cam surfaces 264 and 266 begin at a junction edge 268, which forms a slightly obtuse angle with the internal cylindrical wall 258, when the cam surfaces align with the cross pin along tangential lines as introduced above, (FIGS. 17A and 21), thus forming the closest approach to the first opening 252 for the first cam structure 260. The first and second cam surfaces 264 and 266 diverge upwardly and about the internal cylindrical wall 258 away from the first opening 252 towards the second opening 160. In the present example, the cam surfaces 264 and 266 rise at a constant rate or pitch beginning with the edge 268 and concluding with the intersection with the first support structure 270. At any given point, each cam surface is formed at a substantially right angle or a slightly obtuse angle relative to the internal cylindrical wall 258. Additionally, at any given point, the width of each cam surface is substantially constant from the junction 268 almost to the end of the respective cam surface farthest from the junction 268, with the exception described below with respect to the reinforcement. Other cam configurations are possible including varying the rate or pitch so that it is not constant, or to remove the cam structures 260 and 262 altogether (zero pitch or rise). These alternatives may be desired for particular applications.

Figure 15A:
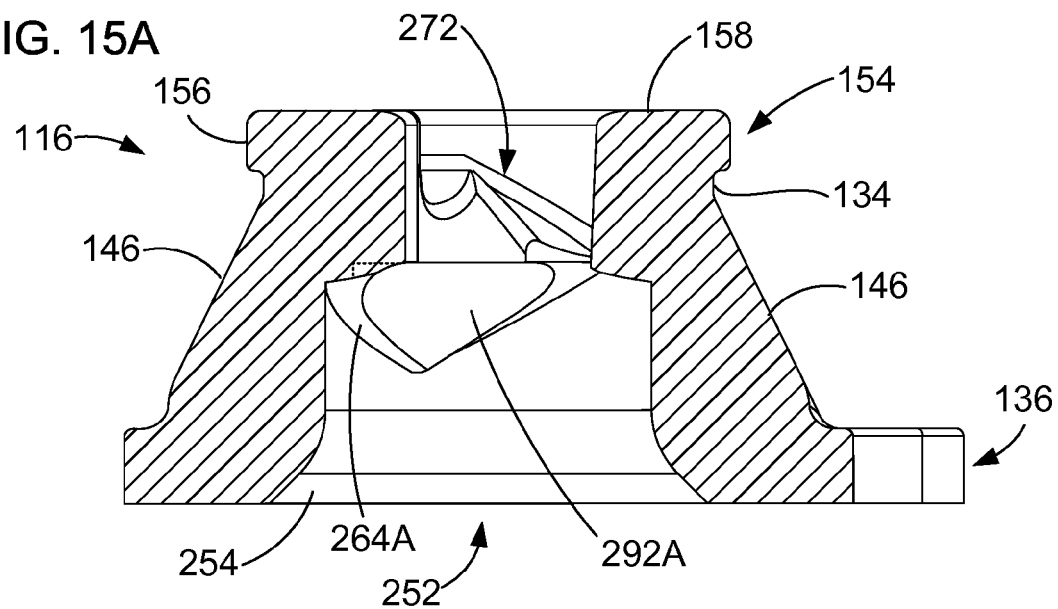
FIG. 15A is a sectional view of the fastener receptacle taken at an approximately 135 degree angle to line 17-17, which has it looking in a direction partly opposite that for FIG. 17.
Figure 15B:
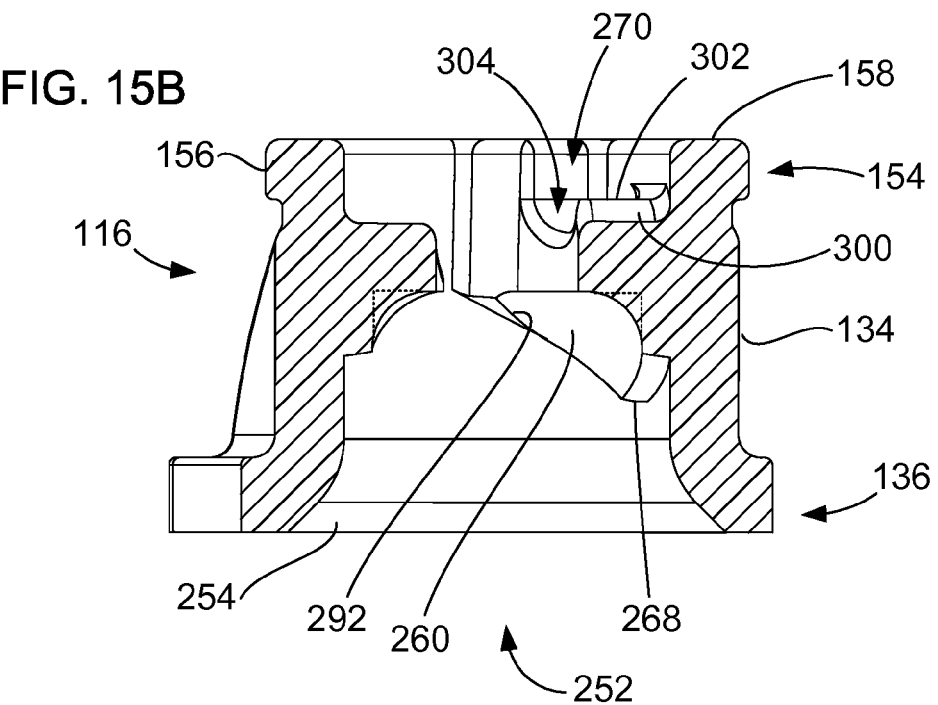
FIG. 15B is a sectional view of the fastener receptacle taken at an approximately 43 degree angle to line 17-17, which has it looking in a direction partly the same as that for FIG. 17.
Figure 27A:
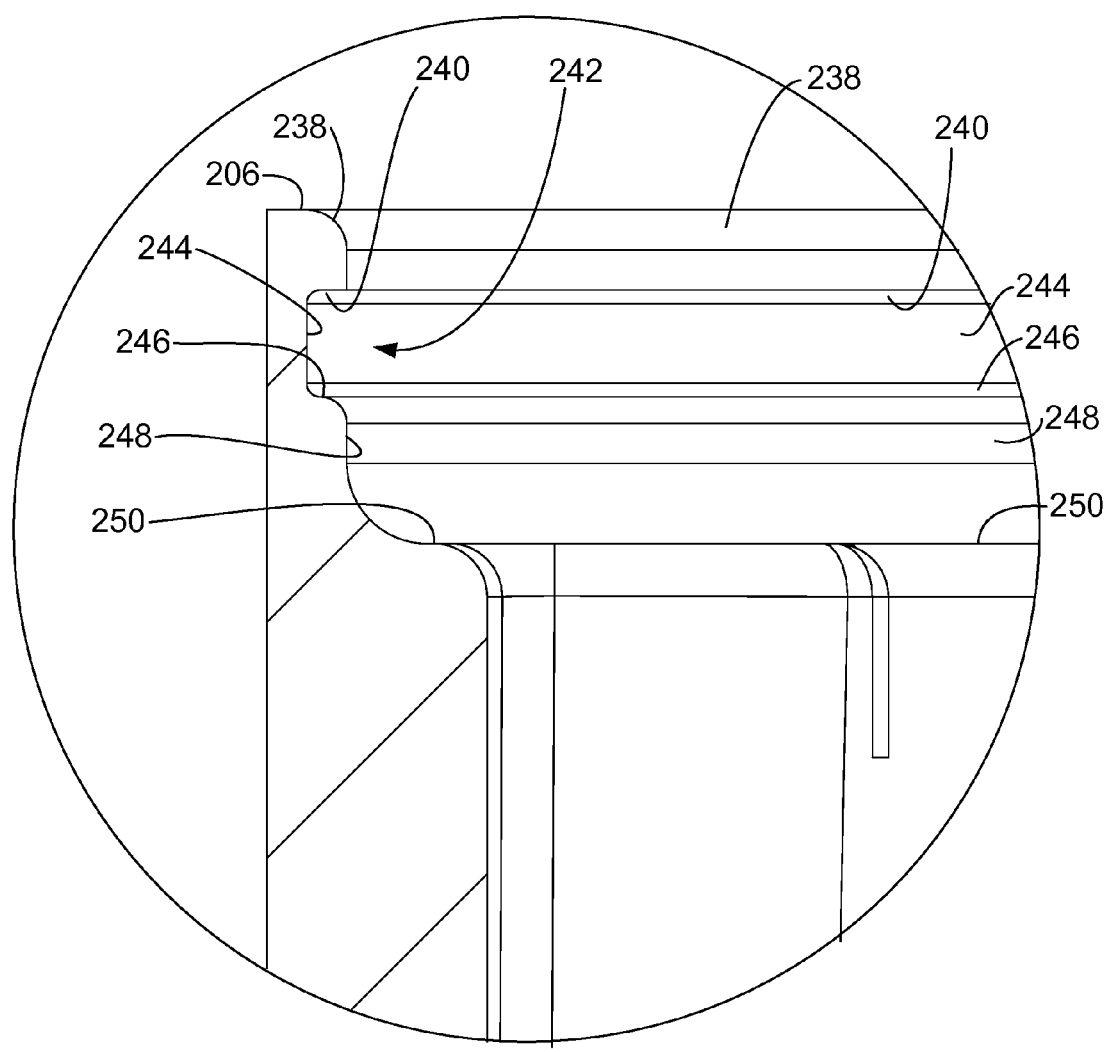
FIG. 27A is a detailed view of a portion of the receptacle shown in FIG. 27.

The cam surface structure 260 extends axially along the internal cylindrical wall 258 of the receptacle body. The cam surface structure 260 extends angularly relative to the axis 152 approximately 150 degrees in the present configuration (see FIG. 21). Other configurations are possible that may increase or decrease this angle. Additionally, the cam surface structure 260 extends axially to a first support structure 270, described more fully below. The first support structure guides the shank and cross pin of the fastener stud assembly to a holding area and holds the fastener stud assembly in the receptacle until it is removed. The first support structure 270 can be a boss, an engagement element or portion for receiving the cross pin of the stud or other structures for receiving and holding the fastener stud assembly in place. In the present example, the cam surface structure 260 joins the first support structure 270 over an extent from a first angular end edge 274 of the structure 270 to a second angular end edge 276 (FIGS. 15, 17A and 19A). Therefore, in the present examples, the cam surface structure 260 ends coincident with the adjacent ends of the first support structure 270.

As with the first and second cam surface structures 260 and 262, the first and second support structures 270 and 272, respectively, match each other to the extent that each point on the first support structure 270 has an identical point diametrically opposite on the second support structure 272. Therefore, the first and second support structures are symmetric with respect to the axis 152. The symmetry of the cam surface structures and of the first and second support structures arises from the axial symmetry of the fastener stud shank 108 and the cross pin 114. The symmetry allows the fastener stud assembly to be combined with the receptacle regardless of the angular orientation of the cross pin 114. Hereafter, only the first support structure 270 will be described in detail.

The first and second support structures 270 and 272 extend inwardly toward the central axis 152 from respective wall portions on the inside of the receptacle body. Each extends inward to an inner-most surface, which combine with the intermediate cylindrical walls of the receptacle body to form a non-circular passage way 278 between the first and second support structures 270 and 272 (FIGS. 15 and 21). Specifically, the first support structure 270 extends inwardly from the adjacent portion of the receptacle body to first and second chord surfaces 280 and 282 (FIG. 15), which are substantially parallel to each other in a plane extending along a chord of a circle defined by the cylindrical wall of the receptacle body. The first and second chord surfaces 280 and 282 extend inward from adjacent surfaces of the internal cylindrical wall to an arcuate wall 284 connecting them. The arcuate wall 284 and the corresponding arcuate wall 284A on the second support structure 272 define part of a circle centered on the central axis 152. The diameter of the circle is sufficiently larger than the diameter of the shank 108 of the stud assembly to allow the shank to pass through between the first and second support structures. The non-circular passage way 278 allows the shank portion of the stud assembly to pass freely through the first opening 252 and between the first and second support structures.

Because the first and second support structures 270 and 272 are elements that are cantilevered beyond the cam surface structures, they may be subject to stresses that could cause fracture. To reduce the possibility of fracture, an interior structure 286 (FIGS. 16-19A) is included for reinforcement. As shown in the drawings, the interior structure 286 is adjacent and is part of a lower surface 288 (FIGS. 16A and 18A) of the first support structure 270 and extends part way radially inward in contact with the underside of the first support structure 270. Additionally, the interior structure 286 is adjacent and part of an inner portion of the cam surface structure 260, the inner portion represented at 290 (FIG. 18). As shown in the drawings, the interior structure 286 extends part way between the first support structure 270 and cam surface 262. In the configuration shown in FIGS. 16-19, the interior structure 286 is additional structure between the cam surface structure 260 and the first support structure 270 positioned radially inward of the inner-most radial position of the cam surface 262. It can be seen in the drawings that the interior structure 286 connects or extends between the cam surface structure 260 and the first support structure 270. The interior structure 286 is adjacent a significant portion of the cam surface structure 260 and also a significant portion of the first support structure 270. In other words, the cam surface 262 extends inward from the internal or interior cylindrical wall 258 of the receptacle body to a given radial distance from the center axis 152. The interior structure 286 extends further inward toward the center axis 152 to points less than the given radial distance from the center axis 152. Put another way, the interior structure 286 is on a radius r1 from the center axis 152 that is shorter than a radius r2 (FIG. 18A) on which the cam surface 262 is found. Additionally, the radial thickness of the interior structure varies with axial position, and is greatest in the present example adjacent the lower surface 288.

It can be seen in the drawings that the interior structure 286 decreases the amount of free surface area or exposed surface area for the lower surface 288, and adds interior structure underneath to support the first support structure 270. Therefore, the amount of unsupported surface area for the lower surface 288 is reduced. Additionally, the interior structure 286 supports the first support structure 270, and the amount of support provided by the interior structure 286 increases the support provided to the first support structure 270. The interior structures 286 and 286A in combination with the X1 wall thickness (FIG. 16A) of the first support structure 270 effectively increases the shear area supporting the cross pin in the area of the added material. Additionally, in the area slightly inboard from the ends of the cross pin 114A (FIG. 6), the added material may effectively double the shear area of the material extending the axial distance defined by X2 where the cross pin surfaces bear against the corresponding recess surfaces 304 and 304A (see the recess surfaces described below). With the added interior structure, the fastener assembly 100 will have considerably greater tensile performance than without the added interior structures 286 and 286A. The amount of additional shear support for each cross pin 114 falls off in the radial inward direction as a function of the change in the curvature inner surface of the interior structures 286 and 286A. However, the rate of fall off is relatively low at radial outward positions under the cross pin compared to positions under the cross pin closer to the shank 108. In one example, the shear support provided by the first support structure may fall off linearly, for example about 25% for each 25% of the axial distance from the edge 268 upward to the lower surface 288. In another example, the fall-off may be exponential and may approximate a portion of a parabola, for example. Other variations can be used.

As can be seen in drawings, the amount of surface area of the lower surface 288 that is exposed is reduced. The lower the amount of exposed surface area for the lower surface 288, the more the first support structure 270 can be supported, thereby reducing the possibility of fracture in the first support structure 270.

The interior structure 286 is adjacent and merges with the inside facing wall 290 of the cam surface structure and with the corresponding portions of the lower surface 288. Therefore, the adjacent portions of the interior structure 286 conform to the wall configuration for the lower surface 288 and to a wall configuration for the inward-facing surface 290 of the cam surface structure 260. The interior structure 286 also includes an inward-facing surface 292. The surface 292 can take a number of configurations, and in the configuration shown in FIGS. 16-19, the surface 292 is concave relative to the central axis 152. The radius of curvature of the surface 292 may vary, or may be constant. In the example shown in FIGS. 16-19A, the radius of curvature is approximately 0.080" for a receptacle 116 when applied to a #7 size fastener assembly as defined in the National Aerospace Standards NASM5591 specification. The radius of curvature may be selected to increase the support for the first support structure 270 while still accommodating the cup 122 (FIG. 6) of the fastener stud assembly.

The interior structure 286 supports the first support structure 270 over an angular distance about the central axis 152 corresponding to the angular distance occupied by the first support structure 270. For example, as shown in FIGS. 17A and 21, the angular distance extends from 274 to 276, and interior structure 286 extends over the same angular distance. The angular extent of the interior structure 286 may be less than or greater than that for the first support structure 270, as desired.

As shown in FIGS. 16A and 18A, the interior structure 286 has a partially triangular cross-section with a concave or curved surface 292. The cross-section configuration of the interior structure 286 is substantially the same over the entire angular extent from 274 to 276. However, as the interior structure 286 progresses from the junction 268 toward each respective end point 274 and 276 (FIGS. 17A & 19A), the size of the approximately triangular cross-section decreases as the corresponding cam surface 268 approaches the first support structure 270. The shape of the approximately triangular interior structure 286 in the area of each respective end point 274 and 276 changes as shown in FIGS. 17A and 19A. Specifically, the length of the interface at 288 decreases as the interior structure 286 approaches the opening 278.

The interior structure 286 is shown in the drawings as being integral with both the cam surface structure 260 and the first support structure 270. Having the interior structure integral lends itself to easier manufacture and lower-cost. However, other means for supporting the first support structure 270 can be provided. Also in the present examples, the interior structure 286 is formed from the same material as the rest of the receptacle. Additionally, the interior structure 286 can be formed from a different material than the first support structure 270. This may include one or more metallic or nonmetallic structures, or a combination thereof, that incorporate the remainder of the other features of the receptacle 116, that the first support structure 270 can affix to. These optional supporting methods may include insert molding, which is an injection molding process whereby plastic is injected into a cavity and around an insert piece placed into the same cavity just prior to molding. The result is a single piece with the insert encapsulated by the plastic. Another example could be bonding, snapping-in, or press-fitting a stronger material into the bore represented by the internal cylindrical wall 258 and the lower surface 288. Another example could be to form a component or plurality of components using a harder material for the first support structure 270, in part or in whole; which may include the first and second cam surface structures 260 and 262, the ramp surfaces 300, the landing surfaces 302, the recesses 304, and the stop walls 306, as well as the cam surface structures 260 and 262, or any combination thereof. Again, these could be insert-molded, bonded, press-fit, snapped-in or by others means affixed to the remainder of the receptacle 116. In the present examples, one material is TORLON, and other poly-amide imides as well as other structural plastics can be used, and other materials may include, among others, Vespel or Aurum (PI), Ultem (PEI), Victrex or Ketaspire (PEEK), Primospire (SRP), Polycarbonate, or Epoxide or Phenolic synthetic resins. The material can also be a composite material and may include fiber reinforcement or other strengthening materials. Other materials, including metals or elastomers or any combination thereof may be used, but plastics are relatively easier to manufacture. The receptacles and the caps can be molded from the designated materials, making for easier manufacture.

The configuration of the first support structure 270 inward of the interior cylindrical wall 258 is substantially the same as conventional structures in quarter turn receptacles. For example, a ramp surface 300 extends in an arcuate direction and toward the second opening to a landing surface 302. The landing surface 302 extends flat at approximately the same axial position to a recess 304. The recess 304 has a substantially circular cross-section in the radial direction, for example as viewed in FIG. 17A, terminating at a substantially axially extending stop wall 306. The stop wall 306 forms one side of a block 308 extending in an arcuate direction about the interior cylindrical wall 258 to the end point 276. The top of the block 308 in the receptacle body shown in FIGS. 1-22 is flush with the facing surface 158 (FIG. 6), but in the configuration of the receptacle body shown in FIGS. 23-30, the top of the block 308 ends below the end face 206. In the configuration of the receptacle body 200, a substantially cylindrical bore extends between the top of the block 308 and the groove 242.

In another example of a fastener receptacle (FIGS. 33 and 34), the fastener receptacle 400 can have configurations identical to any of the other fastener receptacles described herein except that in the present example, cam surfaces 402 and 404 extend upwardly toward the corresponding support structure 270 and block 308, respectively, and away from a plane 406. The plane 406 bisects the recess 304 and passes through the junction edge 408, where the two cam surfaces 402 and 404 join. In this configuration, there is substantially the same amount of support material under one side of the recess 304 (on one side of the plane 406) as there is under the opposite side of the recess 304 (on the opposite side of the plane 406). Relative to the other configurations described herein, the junction edge 408 is shifted in an angular direction approximately 20 degrees so as to be positioned beneath the bottom of the recess 304.

In the configuration shown in FIGS. 33 and 34, the cam structure and the interior structure are centered to a greater extent under the center of the recess 304. However, the cam surface 402 rises at a slower rate because it has a greater distance to travel to reach the opening 410, and the cam surface 404 rises at a faster rate because it has less distance to travel to reach the opening 410. Additionally, the cam structure and the interior structure terminate at the opening 410 a greater distance away from the plane 406 with the cam surface 402 than does the cam structure and the interior structure for the cam surface 404. However, the support against shear loading underneath the outer most surface of the cross pin in a fastener assembly is substantially the same in areas on each side of the plane 406 adjacent the plane.

Figure 35:
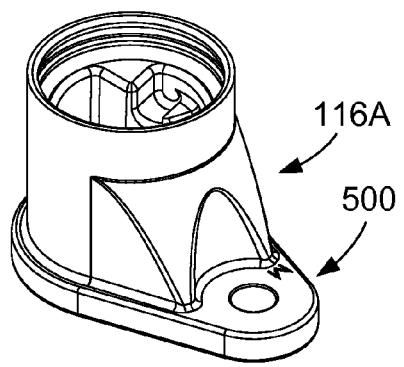
FIG. 35 is an isometric view of a receptacle having a 1-lug mounting configuration.
Figure 37:
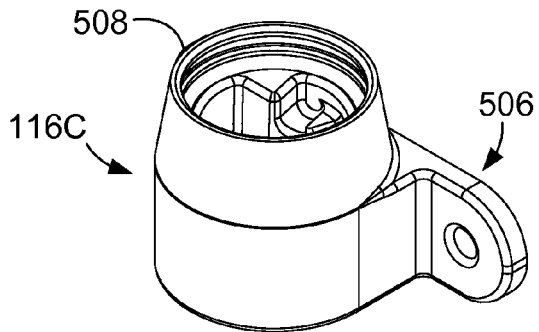
FIG. 37 is an isometric view of a receptacle having a 2-lug vertical flat mounting configuration.
Figure 36:
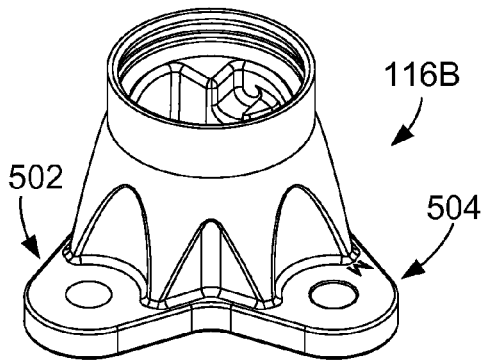
FIG. 36 is an isometric view of a receptacle having a 2-lug flat corner mounting configuration.
Figure 38:
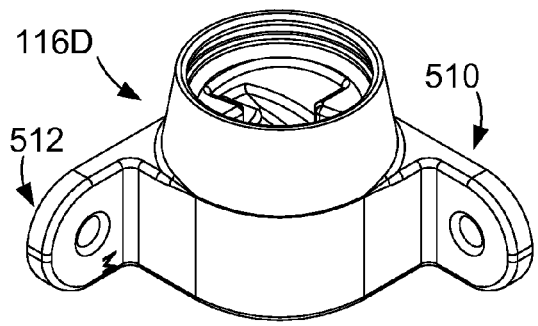
FIG. 38 is an isometric view of a receptacle having a 2-lug vertical corner mounting configuration.
Figure 39:
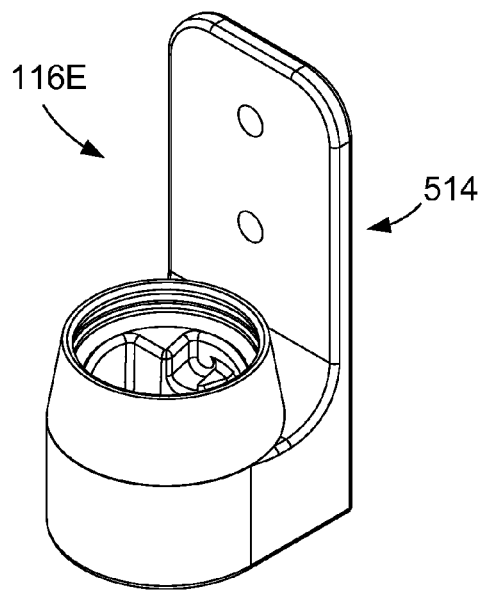
FIG. 39 is an isometric view of a receptacle having a 1-lug vertical mounting configuration.

The present examples defined in FIGS. 1-32 depict a receptacle 116 that is commonly defined as a 2-lug mounting type for the mounting element 136. In other examples, FIGS. 35-39, the receptacle 116 may provide alternative mounting types in place of the present example mounting element 136. Correspondingly; FIG. 35 represents a 1-lug receptacle 116A has a single lug 500 for mounting the receptacle on a support surface, FIG. 36 represents a 2-lug flat corner receptacle 116B having two lugs 502 and 504, FIG. 37 represents a 2-lug vertical flat receptacle 116C having lugs 506 and 508 (with the second lug positioned substantially as a mirror image of the first lug), FIG. 38 represents a 2-lug vertical corner receptacle 116D having two vertically oriented lugs 510 and 512, and FIG. 39 represents a 1-lug vertical receptacle 116E having a single lug 514. These and other mounting type configurations of the receptacle are possible. However, it should be understood that these and other types of mounting configurations and related, appropriate mounting element(s) can be accomplished within the parameters of the present inventions.

In use, the shank and cross pin of a fastener stud assembly is inserted into the first opening of the receptacle. Each cross pin engages an adjacent cam surface and arrives along the cam surface to the opening 278 while the stud assembly pivots. The cross pins enter the opening 278, after which counter clockwise manipulation of the fastener stud assembly moves the cross pins along the ramp surfaces 300 to the landing surfaces 302. The cross pins move across the landing surfaces 302 and then enter the recesses 304 upon hitting the stop wall 306. The action of the spring 124 biases the cross pins into the recesses 304. The fastener stud assembly is removed by depressing the spring 124 and reversing the pivoting of the assembly.

Having thus described several exemplary implementations, it will be apparent that various alterations and modifications can be made without departing from the concepts discussed herein. Such alterations and modifications, though not expressly described above, are nonetheless intended and implied to be within the spirit and scope of the inventions. Accordingly, the foregoing description is intended to be illustrative only.

What is claimed is:

1. A receptacle for a fastener, the receptacle comprising:
a substantially cylindrical body of a non-metal material having an axis and an internal wall;
a first wall defining a first opening on the axis at a first end portion of the body;
a second wall defining a second opening on the axis at a second end portion of the body;
a third wall defining a non-circular passageway between the first and second openings and substantially symmetric with respect to the axis;

a boss extending inwardly from an internal portion of the body and having a curved seat having a seat surface facing at least partly toward the second opening and extending angularly relative to the axis a first angular distance, wherein the boss includes a lower surface facing the first opening and a cam surface structure facing at least partly toward the first opening and wherein the cam surface structure has first and second components and wherein the first component faces the first opening and the second component faces a portion of the internal wall of the body opposite the boss;

an interior structure adjacent the lower boss surface and inboard of the cam surface structure and extending between the lower boss surface and the cam surface structure and also extending angularly relative to the axis at least to the same extent as the first angular distance; and means for substantially securing the receptacle to a surface.

2. The receptacle of claim 1 wherein the body is formed from plastic.

3. The receptacle of claim 1 wherein the body is formed from a thermoplastic amorphous polymer.

4. The receptacle of claim 1 wherein the body is formed from polyamide-imide, or other high performance engineered polymer.

5. The receptacle of claim 1 wherein the body includes an external wall that is substantially right circular.

6. The receptacle of claim 1 wherein the body includes a wall extending between the boss and the second opening having an internal wall surface that is substantially circular.

7. The receptacle of claim 1 wherein the first opening has a substantially circular interior.

8. The receptacle of claim 1 wherein the first opening has a curved entry surface transitioning from the securing means to the first end portion of the body.

9. The receptacle of claim 1 wherein the cam surface structure includes a ramp surface extending from adjacent the first end portion to the boss.

10. The receptacle of claim 9 wherein the cam surface structure includes a second ramp surface to the boss.

11. The receptacle of claim 10 wherein the ramp surface is a first ramp surface and wherein the first and second ramp surfaces extend to opposite sides of the boss.

12. The receptacle of claim 10 wherein the ramp surface is a first ramp surface and wherein the first and second ramp surfaces extend in substantially a V-shape.

13. The receptacle of claim 10 wherein the ramp surface is a first ramp surface and wherein the first and second ramp surfaces are mirror images of each other.

14. The receptacle of claim 9 wherein the ramp surface extends outward from the internal wall of the body a first distance and the boss extends outward from the internal wall of the body a second distance greater than the first distance, and wherein the boss extends the second distance to part of the third wall of the non-circular passageway.

15. The receptacle of claim 1 wherein the interior structure is formed from the same material as the body.

16. The receptacle of claim 1 wherein the interior structure extends angularly along substantially the entire boss from one side of the non-circular passageway to another side of the non-circular passageway.

17. The receptacle of claim 1 wherein the interior structure has a cross section with a concave surface.

18. The receptacle of claim 1 wherein the boss and the cam surface structure provide shear support and wherein the interior structure increases the shear support.

19. The receptacle of claim 18 wherein the interior structure approximately doubles the shear support under at least a portion of the curved seat.

20. The receptacle of claim 1 wherein the non-circular passageway includes a diametric slot opening symmetrical about the axis and a circular opening about the axis.

21. The receptacle of claim 20 wherein the curved seat is on a second diameter non-perpendicular to the diametric slot.

22. The receptacle of claim 21 wherein the diametric slot has a diameter equal to the diameter of the internal wall and wherein a length of the curved seat and a radius of the circular opening substantially equals a radius of the internal wall.

23. The receptacle of claim 21 wherein the first and second cam components meet at an edge and wherein the edge is axially substantially aligned with the curved seat.

24. The receptacle of claim 23 wherein the receptacle is formed from plastic.

25. The receptacle of claim 21 wherein the first and second cam components meet at an edge and wherein the edge is axially offset from the curved seat.

26. The receptacle of claim 25 wherein the receptacle is formed from plastic.

27. The receptacle of claim 1 wherein the boss includes a stop surface adjacent the curved seat.

28. The receptacle of claim 27 further including a ramp surface formed on the boss adjacent the curved seat opposite the stop surface.

29. The receptacle of claim 28 wherein the boss is formed from the ramp surface, the curved seat and the stop surface, wherein the ramp surface is extending from one side of the non-circular passageway substantially to the curved seat, and the stop surface extends from the curved seat to another side of the non-circular passageway.

30. The receptacle of claim 29 wherein the boss is a first boss and further including a second boss opposite the first boss and wherein the second boss includes a ramp surface, a curved seat, and a stop surface.

31. The receptacle of claim 30 further including a substantially cylindrical wall between the first and second bosses and the second opening.

32. The receptacle of claim 1 wherein the securing means includes a mounting flange.

33. The receptacle of claim 32 wherein the mounting flange extends from opposite sides of the first opening.

34. The receptacle of claim 33 wherein the mounting flange includes means for mounting the flange to a surface.

35. The receptacle of claim 34 wherein the means for mounting includes fastener openings.

36. The receptacle of claim 35 wherein the means for mounting includes adhesive.

37. The receptacle of claim 1 including a support wall extending between the body and the securing means.

38. A receptacle for a fastener, the receptacle comprising:
a base member for mounting the receptacle on a support surface;
a non-metal body having an axis and an internal wall extending between a first wall defining a first opening and a second wall defining a second opening;
a third wall extending inward from the internal wall and having an upper surface extending inwardly for receiving a fastener component wherein the upper surface is configured to restrict movement of the fastener component toward the first opening and wherein the upper surface has a first angular position at a first axial location between the first and second openings;
a reinforcement portion positioned between the third wall and the first opening, and supporting the first wall third wall, and wherein the reinforcement portion extends from the internal wall inwardly under the first wall third wall and wherein the reinforcement portion includes an interior wall extending in a direction toward the second opening and inward away from the internal wall; and at least a first cam surface extending inward from the internal wall and extending in a direction from the first opening toward the second opening and a second cam surface extending from adjacent the first cam surface toward the upper surface of the first wall.

39. The receptacle of claim 38 further including a cap over the second opening.

40. The receptacle of claim 39 wherein the cap fits over an outer wall of the second opening.

41. The receptacle of claim 39 wherein the cap fit inside an internal wall of the second opening.

42. The receptacle of claim 38 wherein the third wall is cantilevered from the internal wall of the body.

43. The receptacle of claim 38 further including a reinforcement wall on an outer surface of the body.

44. The receptacle of claim 38 further including a third cam surface extending inward from the internal wall, joining the first cam surface at a joinder position and extending away from the first cam surface in a direction from the first opening toward the second opening, and wherein the joinder position is substantially axially aligned with the upper surface of the third wall.

45. The receptacle of claim 38 further including a third cam surface extending inward from the internal wall, joining the first cam surface at a joinder position and extending away from the first cam surface in a direction from the first opening toward the second opening, and wherein the joinder position is axially offset from the upper surface of the third wall.

46. The receptacle of claim 38 wherein the reinforcement portion provides sheer support.

47. The receptacle of claim 46 wherein the reinforcement portion includes a curved surface facing partly toward the first opening.

48. The receptacle of claim 38 wherein the base member includes at least one wall defining an opening and further including a reinforcement element in the opening.

49. A fastener assembly comprising:
a receptacle including:
a base member for mounting the receptacle on a support surface;
a non-metal body having an axis and an internal wall extending between a first wall defining a first opening and a second wall defining a second opening;
a third wall extending inward from the internal wall and having an upper surface extending inwardly for receiving a fastener component wherein the upper surface is configured to restrict movement of the fastener component toward the first opening and wherein the upper surface has a first angular position at a first axial location between the first and second openings;
a reinforcement portion positioned between the third wall and the first opening, and supporting the third wall, and wherein the reinforcement portion extends from the internal wall inwardly under the third wall and wherein the reinforcement portion includes an interior wall extending in a direction toward the second opening and inward away from the internal wall; and
at least a first cam surface extending inward from the internal wall and extending in a direction from the first opening toward the second opening and a second cam surface extending from adjacent the first cam surface toward the upper surface of the first wall; and a fastener extending into the receptacle and having a cross pin engaging the upper surface of the first wall.

50. The receptacle of claim 49 wherein the fastener includes a spring bias.

51. A receptacle for a fastener, the receptacle comprising:
a mounting element;
a cylindrical non-metal body on the mounting element and having a first wall defining a first circular opening and a second wall defining a second circular opening and an internal wall extending between the first and second openings;
first and second cantilever elements extending toward each other from respective portions of the internal wall wherein each of the first end second cantilever elements include respective support surfaces facing the second opening;
first and second cam structures under the first and second cantilever elements, respectively, wherein the first cam structure is supported by the internal wall and the second cam structure is supported by the internal wall, and wherein each of the first and second cam structures include respective first and second cam surfaces joined at joinder positions and extending toward the second opening;
first and second reinforcement structures on respective ones of the first and second cam structures and contacting respective ones of the first and second cantilever elements to support the respective first and second cantilever elements.

52. The receptacle of claim 51 wherein the receptacle is a monolithic receptacle.

53. The receptacle of claim 52 wherein a receptacle is formed from an engineered plastic.

54. The receptacle of claim 52 wherein the receptacle is formed from a polyamide imide.

55. A receptacle for a fastener, the receptacle comprising:
a receptacle including:
a mounting element;
a cylindrical non-metal body on the mounting element and having a first wall defining a first circular opening and a second wall defining a second circular opening and an internal wall extending between the first and second openings;
first and second cantilever elements extending toward each other from respective portions of the internal wall wherein each of the first end second cantilever elements include respective support surfaces facing the second opening;
first and second cam structures under the first and second cantilever elements, respectively, wherein the first cam structure is supported by the internal wall and the second cam structure is supported by the internal wall, and wherein each of the first and second cam structures include respective first and second cam surfaces joined at joinder positions and extending toward the second opening;
first and second reinforcement structures on respective ones of the first and second cam structures and contacting respective ones of the first and second cantilever elements to support the respective first and second cantilever elements; and
a spring-biased fastener having a fastener shank and a cross pin and wherein the cross pin is supported by the support surfaces of the first and second cantilever elements.

* * * * *

UNITED STATES PATENT AND TRADEMARK OFFICE
CERTIFICATE OF CORRECTION

| | | |
|---|---|---|
| PATENT NO. | : 7,874,779 B2 | Page 1 of 1 |
| APPLICATION NO. | : 11/781777 | |
| DATED | : January 25, 2011 | |
| INVENTOR(S) | : Terrence Csik and Igor Komsitsky | |

It is certified that error appears in the above-identified patent and that said Letters Patent is hereby corrected as shown below:

Claim 38, column 20, line 67; and column 21, line 2, delete "first wall", two occurrences.

Claim 51, column 22, line 17, change "first end second" to -- first and second --.

Claim 55, column 22, line 47, change "first end second" to -- first and second --.

Signed and Sealed this
Nineteenth Day of July, 2011

David J. Kappos
*Director of the United States Patent and Trademark Office*